United States Patent
Fripp et al.

(10) Patent No.: US 11,572,749 B2
(45) Date of Patent: Feb. 7, 2023

(54) NON-EXPANDING LINER HANGER

(71) Applicant: Halliburton Energy Services, Inc., Houston, TX (US)

(72) Inventors: Michael Linley Fripp, Carrollton, TX (US); Emile Edmund Sevadjian, Carrollton, TX (US); Abdol Reza Gharesi, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/124,217

(22) Filed: Dec. 16, 2020

(65) Prior Publication Data
US 2022/0186575 A1     Jun. 16, 2022

(51) Int. Cl.
E21B 23/01    (2006.01)
E21B 33/10    (2006.01)

(52) U.S. Cl.
CPC ............. *E21B 23/01* (2013.01); *E21B 33/10* (2013.01)

(58) Field of Classification Search
CPC ........ E21B 26/06; E21B 43/103; E21B 33/10; E21B 23/01
See application file for complete search history.

(56) References Cited

U.S. PATENT DOCUMENTS

| | | |
|---|---|---|
| 1,982,569 A | 11/1934 | Byrd |
| 3,046,601 A | 7/1962 | Hubbert et al. |
| 3,385,367 A | 5/1968 | Kollsman |
| 4,445,694 A | 5/1984 | Flaherty |
| 4,612,985 A | 9/1986 | Rubbo et al. |
| 4,846,278 A | 7/1989 | Robbins |
| 5,139,235 A | 8/1992 | Kilmer |
| 5,163,321 A | 11/1992 | Perales |
| 5,803,177 A | 9/1998 | Hriscu et al. |

(Continued)

FOREIGN PATENT DOCUMENTS

| | | |
|---|---|---|
| CA | 2751473 A1 | 8/2010 |
| CA | 2751473 C | 9/2014 |

(Continued)

OTHER PUBLICATIONS

International Search Report and Written Opinion dated Aug. 2, 2018, International PCT Application No. PCT/US2017/061307.

(Continued)

*Primary Examiner* — Taras P Bemko
*Assistant Examiner* — Ronald R Runyan
(74) *Attorney, Agent, or Firm* — McGuireWoods LLP

(57) ABSTRACT

Methods and apparatus for positioning a non-expandable liner hanger in a wellbore. A liner is coupled to the liner hanger, wherein the liner hanger comprises: a conduit body; and a reactive metal sealing element disposed on the conduit body, wherein the reactive metal sealing element comprises a reactive metal having a first volume. An example method includes contacting the reactive metal with a fluid that reacts with the reactive metal to produce a reaction product having a second volume greater than the first volume; and contacting a surface adjacent to the reactive metal sealing element with the reaction product to form a seal against the surface and to anchor the liner hanger from the surface, wherein anchoring the liner hanger to the surface suspends the liner in the wellbore.

20 Claims, 18 Drawing Sheets

(56) References Cited

U.S. PATENT DOCUMENTS

| | | | |
|---|---|---|---|
| 6,098,717 A | 8/2000 | Bailey et al. | |
| 6,321,861 B1 | 11/2001 | Leichter | |
| 6,367,845 B1 | 4/2002 | Otten et al. | |
| 6,581,682 B1 | 6/2003 | Parent et al. | |
| 6,640,893 B1 | 11/2003 | Rummel et al. | |
| 6,695,061 B2 | 2/2004 | Fripp et al. | |
| 7,007,910 B1 | 3/2006 | Krinner et al. | |
| 7,040,404 B2 | 5/2006 | Brothers et al. | |
| 7,387,158 B2 | 6/2008 | Murray et al. | |
| 7,431,082 B2 | 10/2008 | Holt et al. | |
| 7,543,639 B2 | 6/2009 | Emerson | |
| 7,562,704 B2 | 7/2009 | Wood et al. | |
| 7,578,347 B2 | 8/2009 | Bosma et al. | |
| 7,591,319 B2 | 9/2009 | Xu | |
| 7,909,110 B2 | 3/2011 | Sharma et al. | |
| 7,931,079 B2 | 4/2011 | Nicholson | |
| 7,984,762 B2 | 7/2011 | Renshaw et al. | |
| 8,083,000 B2 | 12/2011 | Nutley et al. | |
| 8,235,075 B2 | 8/2012 | Saltel | |
| 8,240,377 B2 | 8/2012 | Kulakofsky et al. | |
| 8,434,571 B2 | 5/2013 | Kannan et al. | |
| 8,443,881 B2 | 5/2013 | Thomson et al. | |
| 8,490,707 B2 | 7/2013 | Robisson et al. | |
| 8,499,843 B2 | 8/2013 | Patel et al. | |
| 8,776,899 B2 | 7/2014 | Fripp et al. | |
| 9,033,046 B2 | 5/2015 | Andrew et al. | |
| 9,091,133 B2 | 7/2015 | Stewart et al. | |
| 9,133,683 B2 | 9/2015 | Dyer et al. | |
| 9,404,030 B2 | 8/2016 | Mazyar et al. | |
| 9,518,453 B2 | 12/2016 | Dilber et al. | |
| 9,605,508 B2 | 3/2017 | Xu et al. | |
| 9,624,752 B2 | 4/2017 | Resink | |
| 9,725,979 B2 | 8/2017 | Mazyar et al. | |
| 9,745,451 B2 | 8/2017 | Zhao et al. | |
| 9,856,710 B2 | 1/2018 | Zhu et al. | |
| 9,869,152 B2 | 1/2018 | Gamstedt et al. | |
| 9,976,380 B2 | 5/2018 | Davis et al. | |
| 10,119,011 B2 | 11/2018 | Zhao et al. | |
| 10,364,636 B2 | 7/2019 | Davis et al. | |
| 10,428,624 B2 | 10/2019 | Vasques | |
| 10,704,362 B2 | 7/2020 | Themig et al. | |
| 10,851,615 B2 | 12/2020 | Watson et al. | |
| 10,961,804 B1 | 3/2021 | Fripp et al. | |
| 2002/0125008 A1 | 9/2002 | Wetzel et al. | |
| 2003/0150614 A1 | 8/2003 | Brown et al. | |
| 2003/0159829 A1 | 8/2003 | Fripp et al. | |
| 2004/0118572 A1 | 6/2004 | Whanger et al. | |
| 2004/0149418 A1 | 8/2004 | Bosma et al. | |
| 2004/0244994 A1 | 12/2004 | Jackson | |
| 2005/0039927 A1 | 2/2005 | Wetzel et al. | |
| 2005/0092485 A1 | 5/2005 | Brezinski | |
| 2005/0171248 A1 | 8/2005 | Li et al. | |
| 2005/0199401 A1 | 9/2005 | Patel et al. | |
| 2005/0257961 A1 | 11/2005 | Snell et al. | |
| 2006/0175065 A1 | 8/2006 | Ross | |
| 2007/0089911 A1 | 4/2007 | Moyes | |
| 2007/0095532 A1 | 5/2007 | Head et al. | |
| 2007/0125532 A1 | 6/2007 | Murray et al. | |
| 2007/0200299 A1 | 8/2007 | Kunz | |
| 2007/0257405 A1 | 11/2007 | Freyer | |
| 2008/0066931 A1 | 3/2008 | Xu | |
| 2008/0142214 A1 | 6/2008 | Keller | |
| 2008/0149351 A1 | 6/2008 | Marya et al. | |
| 2008/0185150 A1* | 8/2008 | Brown | E21B 37/00 166/311 |
| 2008/0185158 A1 | 8/2008 | Chalker et al. | |
| 2008/0220991 A1 | 9/2008 | Slay et al. | |
| 2009/0020286 A1 | 1/2009 | Johnson | |
| 2009/0120640 A1 | 5/2009 | Kulakofsky et al. | |
| 2009/0130938 A1 | 5/2009 | Xu et al. | |
| 2009/0173505 A1 | 7/2009 | Patel et al. | |
| 2009/0179383 A1 | 7/2009 | Koloy et al. | |
| 2009/0188569 A1 | 7/2009 | Saltel | |
| 2009/0242189 A1 | 10/2009 | Vaidya et al. | |
| 2009/0242214 A1 | 10/2009 | Foster et al. | |
| 2009/0272546 A1 | 11/2009 | Nutley et al. | |
| 2009/0277651 A1 | 11/2009 | Kilgore | |
| 2009/0277652 A1 | 11/2009 | Nutley et al. | |
| 2010/0038074 A1 | 2/2010 | Patel | |
| 2010/0139930 A1 | 6/2010 | Patel et al. | |
| 2010/0163252 A1 | 7/2010 | Regnault De La Mothe et al. | |
| 2010/0212891 A1 | 8/2010 | Stewart et al. | |
| 2010/0270031 A1 | 10/2010 | Patel | |
| 2010/0307770 A1 | 12/2010 | Sponchia et al. | |
| 2011/0073310 A1 | 3/2011 | Clemens | |
| 2011/0098202 A1 | 4/2011 | James et al. | |
| 2011/0174504 A1 | 7/2011 | Wright et al. | |
| 2011/0226374 A1 | 9/2011 | Kalman | |
| 2011/0252879 A1 | 10/2011 | Madhavan et al. | |
| 2011/0253393 A1 | 10/2011 | Vaidya et al. | |
| 2012/0006530 A1 | 1/2012 | Crabb et al. | |
| 2012/0055667 A1 | 3/2012 | Ingram et al. | |
| 2012/0073834 A1 | 3/2012 | Lembcke | |
| 2012/0132427 A1 | 5/2012 | Renshaw et al. | |
| 2012/0175134 A1 | 7/2012 | Robisson et al. | |
| 2012/0205092 A1 | 8/2012 | Givens et al. | |
| 2012/0272546 A1 | 11/2012 | Tsai | |
| 2012/0292013 A1 | 11/2012 | Munshi et al. | |
| 2012/0292023 A1 | 11/2012 | Hinkie et al. | |
| 2012/0318513 A1 | 12/2012 | Mazyar et al. | |
| 2013/0056196 A1 | 3/2013 | Hench | |
| 2013/0056227 A1 | 3/2013 | Sponchia | |
| 2013/0056228 A1 | 3/2013 | Gruetzmann et al. | |
| 2013/0146312 A1 | 6/2013 | Gerrard et al. | |
| 2013/0248179 A1 | 9/2013 | Yeh et al. | |
| 2014/0051612 A1* | 2/2014 | Mazyar | E21B 33/1208 507/269 |
| 2014/0054047 A1 | 2/2014 | Zhou | |
| 2014/0060815 A1 | 3/2014 | Wang et al. | |
| 2014/0102728 A1 | 4/2014 | Gamstedt et al. | |
| 2014/0231086 A1 | 8/2014 | Jamison et al. | |
| 2014/0238692 A1 | 8/2014 | Watson | |
| 2014/0251641 A1 | 9/2014 | Marya et al. | |
| 2014/0262351 A1 | 9/2014 | Derby | |
| 2014/0318780 A1 | 10/2014 | Howard | |
| 2014/0354443 A1 | 12/2014 | Roberson et al. | |
| 2014/0361497 A1 | 12/2014 | Porta | |
| 2015/0021044 A1 | 1/2015 | Davis et al. | |
| 2015/0060064 A1 | 3/2015 | Lafferty et al. | |
| 2015/0101813 A1 | 4/2015 | Zhao et al. | |
| 2015/0199401 A1 | 7/2015 | Polehn et al. | |
| 2015/0267501 A1 | 9/2015 | Al-Gouhi | |
| 2015/0275644 A1 | 10/2015 | Chen et al. | |
| 2015/0308214 A1 | 10/2015 | Bilansky et al. | |
| 2015/0344772 A1 | 12/2015 | Droger et al. | |
| 2015/0369027 A1 | 12/2015 | Jones et al. | |
| 2016/0032696 A1 | 2/2016 | Caccialupi et al. | |
| 2016/0137912 A1 | 5/2016 | Sherman et al. | |
| 2016/0138359 A1 | 5/2016 | Zhao et al. | |
| 2016/0145965 A1 | 5/2016 | Zhao et al. | |
| 2016/0194933 A1 | 7/2016 | O'Brien et al. | |
| 2016/0201425 A1 | 7/2016 | Walton et al. | |
| 2016/0215604 A1 | 7/2016 | Potapenko | |
| 2016/0230495 A1 | 8/2016 | Mazyar et al. | |
| 2016/0319633 A1 | 11/2016 | Cooper et al. | |
| 2016/0376869 A1 | 12/2016 | Rochen et al. | |
| 2016/0376870 A1 | 12/2016 | Roselier et al. | |
| 2017/0122062 A1 | 5/2017 | Freyer | |
| 2017/0191343 A1 | 7/2017 | Solhaug | |
| 2017/0234103 A1 | 8/2017 | Frazier | |
| 2017/0335673 A1 | 11/2017 | Burke et al. | |
| 2018/0078998 A1 | 3/2018 | Sherman | |
| 2018/0085154 A1 | 3/2018 | Kulper et al. | |
| 2018/0087346 A1 | 3/2018 | Rochen | |
| 2018/0087350 A1 | 3/2018 | Sherman | |
| 2018/0266215 A1 | 9/2018 | Fagley, IV et al. | |
| 2018/0355691 A1 | 12/2018 | Andersen | |
| 2018/0355693 A1 | 12/2018 | Al-Abduljabbar et al. | |
| 2019/0017285 A1 | 1/2019 | Kain | |
| 2019/0055808 A1 | 2/2019 | Krueger | |
| 2019/0055839 A1 | 2/2019 | Skillingstad et al. | |
| 2019/0128074 A1 | 5/2019 | Stokes et al. | |
| 2019/0153852 A1 | 5/2019 | Lallemand et al. | |
| 2019/0203101 A1 | 7/2019 | Dusterhoft et al. | |

(56) References Cited

U.S. PATENT DOCUMENTS

| | | | |
|---|---|---|---|
| 2019/0249509 | A1 | 8/2019 | Jakkula et al. |
| 2019/0360297 | A1 | 11/2019 | Heiman et al. |
| 2020/0240235 | A1 | 7/2020 | Fripp et al. |
| 2020/0325749 | A1 | 10/2020 | Fripp et al. |
| 2020/0370391 | A1 | 11/2020 | Fripp et al. |
| 2021/0017441 | A1 | 1/2021 | Fripp et al. |
| 2021/0079756 | A1 | 3/2021 | Omelaz et al. |
| 2021/0140255 | A1 | 5/2021 | Greci et al. |
| 2021/0189817 | A1 | 6/2021 | Fripp et al. |
| 2021/0332659 | A1 | 10/2021 | Fripp et al. |
| 2021/0353037 | A1 | 11/2021 | Cote |
| 2022/0074221 | A1 | 3/2022 | Laimbeer et al. |

FOREIGN PATENT DOCUMENTS

| | | | |
|---|---|---|---|
| CA | 3085547 | A1 | 8/2019 |
| CN | 1708631 | A | 12/2005 |
| CN | 102027189 | A | 4/2011 |
| CN | 104583530 | A | 4/2015 |
| CN | 105422146 | A | 3/2016 |
| CN | 106522923 | A | 3/2017 |
| CN | 107148444 | A | 9/2017 |
| CN | 107250321 | A | 10/2017 |
| CN | 107532466 | A | 1/2018 |
| EP | 2399000 | A2 | 12/2011 |
| EP | 2217790 | B1 | 10/2016 |
| EP | 2753791 | B1 | 6/2017 |
| FR | 3073549 | A1 | 5/2019 |
| GB | 2381278 | A | 4/2003 |
| GB | 2416796 | A | 2/2006 |
| GB | 2469723 | A | 10/2010 |
| GB | 2514195 | B | 6/2019 |
| GB | 2583232 | A | 10/2020 |
| GB | 2557397 | B | 8/2021 |
| MX | 2011008597 | A | 9/2011 |
| RU | 2424419 | C1 | 7/2011 |
| RU | 2588501 | C2 | 6/2016 |
| RU | 182236 | U1 | 8/2018 |
| WO | 3026501 | A1 | 5/2000 |
| WO | 2008079486 | A1 | 7/2008 |
| WO | 2010096417 | A2 | 8/2010 |
| WO | 2012090056 | A2 | 7/2012 |
| WO | 2013033208 | A1 | 3/2013 |
| WO | WO-2014098885 | A1 * | 6/2014 ............ E21B 43/106 |
| WO | WO-2014110382 | A1 * | 7/2014 ............. E21B 33/12 |
| WO | 2014210283 | A1 | 12/2014 |
| WO | 2016171666 | A1 | 10/2016 |
| WO | 2018005740 | A1 | 1/2018 |
| WO | 2018057361 | A1 | 3/2018 |
| WO | 2018085102 | A1 | 5/2018 |
| WO | 2018147833 | A1 | 8/2018 |
| WO | 2019094044 | A1 | 5/2019 |
| WO | WO-2019094044 | A1 * | 5/2019 ............. F16J 15/125 |
| WO | 2019147285 | A1 | 8/2019 |
| WO | 2019164492 | A1 | 8/2019 |
| WO | 2019164499 | A1 | 8/2019 |
| WO | 2020005252 | A1 | 1/2020 |
| WO | 2020018110 | A1 | 1/2020 |
| WO | 2020068037 | A1 | 4/2020 |
| WO | 2021021203 | A1 | 2/2021 |
| WO | 2021076141 | A1 | 4/2021 |

OTHER PUBLICATIONS

Search Report in FR Application No. 1859379, dated Oct. 15, 2019.
International Search Report and Written Opinion dated Nov. 19, 2018; International PCT Application No. PCT/US2018/019337.
Denmark Examination Report and Search Report dated Mar. 16, 2021, Denmark Application No. PA202070389.
International Search Report and Written Opinion dated Jul. 8, 2020, issued in related International Application No. PCT/US2019/056814.
International Search Report and Written Opinion for corresponding PCT International Application No. PCT/US2019/068497; dated Sep. 17, 2020.
International Search report and Written Opinion for corresponding International Patent Application No. PCT/US2019/062225, dated Aug. 11, 2020.
International Search report and Written Opinion issued in related PCT/US2019/068493 dated Sep. 15, 2020.
Nemisis Annulus Swellable Packer, Weatherford, Swellable Products, 2009-2011.
International Search Report issued in related PCT/US2020/066193, dated Sep. 8, 2021.
International Search Report and Written Opinion dated Nov. 22, 2019; International PCT Application No. PCT/US2019/019210.
International Search Report and Witten Opinion dated May 20, 2020, issued in related PCT/US2019/047529.
Tao, Solid expandable tubular patching technique for high-temperature and high-pressure casing damaged wells, Research Paper, Jun. 2015, pp. 408-413, Petroleum Exploration and Development, vol. 42, Issue 3.
Dutch Search Report issued in NL 2026726, dated Aug. 13, 2021.
International Search Report and Written Opinion in PCT/US2020/066193, dated Sep. 8, 2021.
Search Report and Written Opinion issued in NL2026329, dated Aug. 13, 2021.
Written Opinion and Search Report in SG Appln No. 11202000316S, dated Aug. 30, 2021.
Dutch Search Report in NL Appln No. 2026737, dated Aug. 13, 2021.
Examination Report in GCC Appln No. GC 2020-39914, dated Jul. 29, 2021.
Office Action in CA Appln No. 3,070,929, dated Jul. 9, 2021.
International Search Report & Written Opinion in PCT/US2019/042074 dated Apr. 10, 2020.
Search Report in NL Appln No. 2025837, dated Sep. 23, 2021.
Office Action in CA Application No. 3,070,929 dated Nov. 19, 2021.
International Search Report & Written Opinion in PCT/US2019/017538, dated Nov. 11, 2019.
Chinese Search Report dated Dec. 17, 2021; CN Application No. 2018800875885.
Examination Report in GB Appln No. 2010931.0 dated, Jan. 18, 2022.
International Search Report & Written Opinion in PCT/US2020/065539, dated Aug. 30, 2021.
International Search Report & Written Opinion in PCT/US2019/058904, dated Jul. 23, 2020.
Netherlands Search Report in Application No. 2025954, dated Mar. 2, 2021.
International Search Report and Written Opinion in PCT/US2019/044542, dated Apr. 28, 2020.
Examination Report in GCC Application No. GC 2020-40201, dated Aug. 31, 2021.
French Search Report issued in FR Appln No. FR2006166, dated May 30, 2022.
International Search Report & Written Opinion in PCT/US2021/048628 dated May 19, 2022.
International Search Report & Written Opinion in PCT/US2021/027245 dated Jan. 10, 2022.
International Search Report and Written Opinion in PCT/US2021/032983, dated Feb. 10, 2022.
Netherlands Search Report in Application No. 2026573 dated Aug. 20, 2021.
Russian Office Action in RU Application No. 2021121198, dated Nov. 25, 2021.
GC Examination Report in GC Application No. 2019-38908, dated Nov. 4, 2020.
GC Examination Report in GC Application No. 2020-40475, dated Nov. 25, 2021.
MY Search Report in MY Application No. PI2020003430, dated May 26, 2022.
GB Examination Report in Application No. 2010931.0 dated Apr. 5, 2022.
DK Examination Report in Application No. PA 202070389, dated Oct. 20, 2021.

(56) References Cited

OTHER PUBLICATIONS

International Preliminary Report on Patentability in PCT/US2019/068493, dated Jun. 30, 2022.
International Preliminary Report on Patentability in PCT/US2019/068497, dated Jun. 30, 2022.

* cited by examiner

NON-EXPANDING LINER HANGER

TECHNICAL FIELD

The present disclosure relates to the use of a non-expanding liner hanger, and more particularly, to the use of a non-expanding liner hanger having reactive metal sealing elements for sealing and anchoring the non-expanding liner hanger in wellbore applications.

BACKGROUND

In some wellbore operations, a liner may be suspended from a casing string or set cement layer with a liner hanger. The liner hanger anchors to the interior of the casing string or set cement layer and suspends the liner below the casing string or set cement layer. The suspended liner and the liner hanger do not extend to the surface as a casing string or set cement layer may. A liner hanger forms a seal with the casing string or set cement layer to prevent fluid flow therein from outside of the suspended liner. The fluid flow may be directed through the liner instead.

Sealing elements may be used for a variety of wellbore applications including forming annular seals in and around liner hangers and anchoring liner hangers to suspend the liner. The annular seal may restrict all or a portion of fluid and/or pressure communication at the seal interface. These sealing elements may seal and anchor the liner hangers to the adjacent surface such as the casing string or set cement layer. Some species of sealing elements comprise swellable materials that may swell if contacted with a specific swell-inducing fluid.

Many species of the aforementioned swellable materials comprise elastomers. Elastomers, such as rubber, swell when contacted with a swell-inducing fluid. The swell-inducing fluid may diffuse into the elastomer where a portion of the fluid may be retained within the internal structure of the elastomer. Swellable materials such as elastomers may be limited to use in specific wellbore environments (e.g., those without high salinity and/or high temperatures). The present disclosure provides improved apparatus and methods for sealing around and anchoring liner hangers in wellbore applications.

BRIEF DESCRIPTION OF THE DRAWINGS

Illustrative examples of the present disclosure are described in detail below with reference to the attached drawing figures, which are incorporated by reference herein, and wherein.

Figure 1:
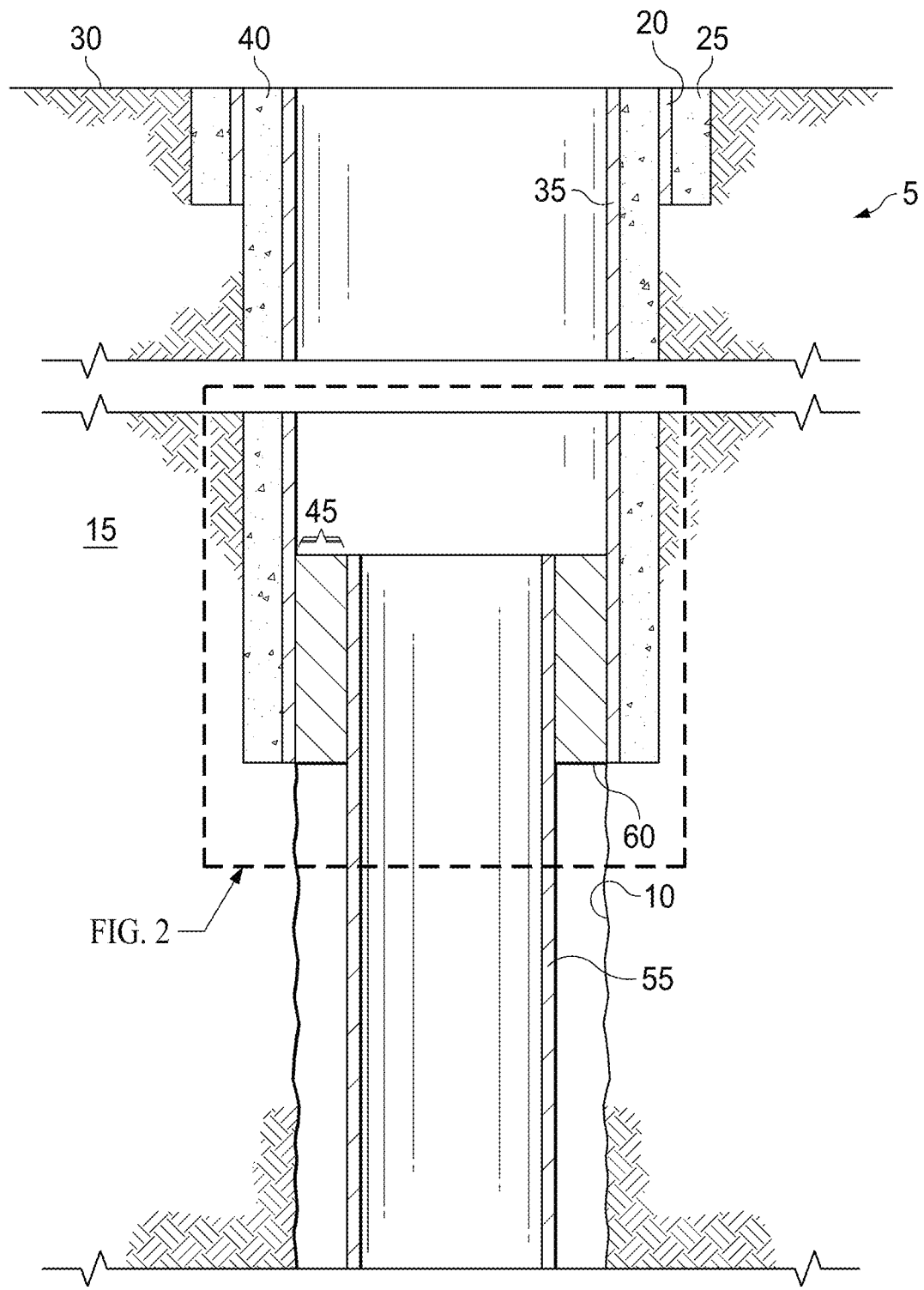
FIG. 1 is a cross-section illustrating an example liner hanger system for a wellbore penetrating a subterranean formation in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates to the use of a non-expanding liner hanger, and more particularly, to the use of a non-expanding liner hanger having reactive metal sealing elements for sealing and anchoring the non-expanding liner hanger in wellbore applications.

In the following detailed description of several illustrative examples, reference is made to the accompanying drawings that form a part hereof, and in which is shown by way of illustration examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples is defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

Examples of the methods and systems described herein relate to the use of non-expanding liner hangers comprising reactive metal sealing elements for annular sealing and anchoring. As used herein, "sealing elements" refers to any element used to form a seal. A "seal" is a barrier to the passage of a liquid and/or gas. In some examples, the reactive metal sealing elements described herein may form a seal that complies with the International Organization for Standardization (ISO) 14310:2001/API Specification 11D1 1$^{st}$ Edition validation standard for the Grade V5: Liquid Test. The reactive metals form seals by contacting specific reaction-inducing fluids, such as a brine, where they then dissolve to produce a reaction product having a larger volume than the base reactive metal reactant. The increase in metal volume of the reaction product creates a seal at the interface of the reactive metal sealing element and any adjacent surface as the reaction product proceeds to solidify at the interface. Formation of the reaction products results in the volumetric expansion of the reactive metal sealing element. The solidified reaction products also anchor the liner hanger to the adjacent surface, securing it in the wellbore and allowing for suspension of the liner. Advantageously, the reactive metal sealing elements may be used in a variety of wellbore applications where an irreversible seal is desired. Yet a further advantage is that the reactive metal sealing elements may swell in high-salinity and/or high-temperature environments that may be unsuitable for some other species of sealing elements. An additional advantage is that the reactive metal sealing elements comprise a wide variety of metals and metal alloys and may react upon contact with reaction-inducing fluids, including a variety of wellbore fluids. The reactive metal sealing elements may be used as replacements for other types of sealing elements (e.g., elastomeric sealing elements), or they may be used as backups for other types of sealing elements. One other advantage is that the reactive metal sealing elements may be placed on an existing liner hanger without impact to or adjustment of the liner hanger outer diameter or exterior profile. Another advantage is that the reactive metal sealing elements are used on non-expanding liner hangers and are able to seal and anchor the liner hanger without expanding the liner hanger. As such, there is no need to proceed with expansion operations such as those utilizing expansion cones, etc. which may add complexity to wellbore operations and increase operation time. Moreover, in some examples, the reactive metal sealing elements do not comprise elastomeric materials and may be usable in wellbore environments where elastomeric materials may be prone to breakdown.

The reactive metals expand by undergoing a reaction in the presence of a reaction-inducing fluid (e.g., a brine) to form a reaction product (e.g., metal hydroxides). The resulting reaction products occupy more volumetric space relative to the base reactive metal reactant. This difference in volume allows the reactive metal sealing element to form a seal at the interface of the reactive metal sealing element and any adjacent surfaces. Magnesium may be used to illustrate the volumetric expansion of the reactive metal as it undergoes reaction with the reaction-inducing fluid. A mole of magnesium has a molar mass of 24 g/mol and a density of 1.74 g/cm$^3$, resulting in a volume of 13.8 cm$^3$/mol. Magnesium hydroxide, the reaction product of magnesium and an aqueous reaction-inducing fluid, has a molar mass of 60 g/mol and a density of 2.34 g/cm$^3$, resulting in a volume of 25.6 cm$^3$/mol. The magnesium hydroxide volume of 25.6 cm$^3$/mol is an 85% increase in volume over the 13.8 cm$^3$/mol volume of the mole of magnesium. As another example, a mole of calcium has a molar mass of 40 g/mol and a density of 1.54 g/cm$^3$, resulting in a volume of 26.0 cm$^3$/mol. Calcium hydroxide, the reaction product of calcium and an aqueous reaction-inducing fluid, has a molar mass of 76 g/mol and a density of 2.21 g/cm$^3$, resulting in a volume of 34.4 cm$^3$/mol. The calcium hydroxide volume of 34.4 cm$^3$/mol is a 32% increase in volume over the 26.0 cm$^3$/mol volume of the mole of calcium. As yet another example, a mole of aluminum has a molar mass of 27 g/mol and a density of 2.7 g/cm$^3$, resulting in a volume of 10.0 cm$^3$/mol. Aluminum hydroxide, the reaction product of aluminum and an aqueous reaction-inducing fluid, has a molar mass of 63 g/mol and a density of 2.42 g/cm$^3$, resulting in a volume of 26 cm$^3$/mol. The aluminum hydroxide volume of 26 cm$^3$/mol is a 160% increase in volume over the 10 cm$^3$/mol volume of the mole of aluminum. The reactive metal may comprise any metal or metal alloy that undergoes a reaction to form a reaction product having a greater volume than the base reactive metal or alloy reactant.

The reactive metals undergo a chemical transformation whereby the metals chemically react with the reaction-inducing fluid, and upon reaction form a metal hydroxide that is the principal component of the seal and anchor. The solidified metal hydroxide is larger in volume than the base reactive metal, allowing for sealing of the annular space around the reactive metal.

Examples of suitable metals for the reactive metal include, but are not limited to, magnesium, calcium, aluminum, tin, zinc, beryllium, barium, manganese, or any combination thereof. Preferred metals include magnesium, calcium, and aluminum.

Examples of suitable metal alloys for the reactive metal include, but are not limited to, alloys of magnesium, calcium, aluminum, tin, zinc, beryllium, barium, manganese, or any combination thereof. Preferred metal alloys include alloys of magnesium-zinc, magnesium-aluminum, calcium-magnesium, or aluminum-copper. In some examples, the metal alloys may comprise alloyed elements that are not metallic. Examples of these non-metallic elements include, but are not limited to, graphite, carbon, silicon, boron nitride, and the like. In some examples, the metal is alloyed to increase reactivity and/or to control the formation of oxides.

In some examples, the metal alloy is also alloyed with a dopant metal that promotes corrosion or inhibits passivation and thus increases hydroxide formation. Examples of dopant metals include, but are not limited to, nickel, iron, copper, carbon, titanium, gallium, mercury, cobalt, iridium, gold, palladium, or any combination thereof.

In some examples, the reactive metal comprises an oxide. As an example, calcium oxide reacts with water in an energetic reaction to produce calcium hydroxide. One mole of calcium oxide occupies 9.5 cm$^3$ whereas one mole of calcium hydroxide occupies 34.4 cm$^3$. This is a 260% volumetric expansion of the mole of calcium oxide relative to the mole of calcium hydroxide. Examples of metal oxides suitable for the reactive metal may include, but are not limited to, oxides of any metals disclosed herein, including magnesium, calcium, aluminum, iron, nickel, copper, chromium, tin, zinc, lead, beryllium, barium, gallium, indium, bismuth, titanium, manganese, cobalt, or any combination thereof.

It is to be understood that the selected reactive metal is chosen such that the formed reactive metal sealing element does not dissolve or otherwise degrade in the reaction-inducing fluid. As such, the use of metals or metal alloys for the reactive metal that form relatively insoluble reaction products in the reaction-inducing fluid may be preferred. As an example, the magnesium hydroxide and calcium hydroxide reaction products have very low solubility in water. As an alternative or an addition, the reactive metal sealing element may be positioned and configured in a way that constrains the degradation of the reactive metal sealing element in the reaction-inducing fluid due to the geometry of the area in which the reactive metal sealing element is disposed. This may result in reduced exposure of the reactive metal sealing element to the reaction-inducing fluid, but may also reduce degradation of the reaction product of the reactive metal sealing element, thereby prolonging the life of the formed seal. As an example, the volume of the area in which the sealing element is disposed may be less than the potential expansion volume of the volume of reactive metal disposed in said area. In some examples, this volume of area may be less than as much as 50% of the expansion volume of reactive metal. Alternatively, this volume of area may be less than 90% of the expansion volume of reactive metal. As another alternative, this volume of area may be less than 80% of the expansion volume of reactive metal. As another alternative, this volume of area may be less than 70% of the expansion volume of reactive metal. As another alternative, this volume of area may be less than 60% of the expansion volume of reactive metal. In a specific example, a portion of the reactive metal sealing element may be disposed in a recess within the conduit body of the liner hanger to restrict the exposure area to only the surface portion of the reactive metal sealing element that is not disposed in the recess.

In some examples, the formed reaction products of the reactive metal reaction may be dehydrated under sufficient pressure. For example, if a metal hydroxide is under sufficient contact pressure and resists further movement induced by additional hydroxide formation, the elevated pressure may induce dehydration of the metal hydroxide to form the metal oxide. As an example, magnesium hydroxide may be dehydrated under sufficient pressure to form magnesium oxide and water. As another example, calcium hydroxide may be dehydrated under sufficient pressure to form calcium oxide and water. As yet another example, aluminum hydroxide may be dehydrated under sufficient pressure to form aluminum oxide and water.

The reactive metal sealing elements may be formed in a solid solution process, a powder metallurgy process, or through any other method as would be apparent to one of ordinary skill in the art. Regardless of the method of manufacture, the reactive metal sealing elements may be slipped over the liner hanger mandrel and held in place via any sufficient method. The reactive metal sealing elements may be placed over the mandrel in one solid piece or in multiple discrete pieces. Once in place, the reactive metal sealing element is held in position with end rings, stamped rings, retaining rings, fasteners, adhesives, set screws, swedging, or any other such method for retaining the reactive metal sealing element in position. In some alternative examples, the reactive metal sealing element may not be held in position and may slide freely on the exterior of the tubular. As discussed above, the reactive metal sealing elements may be formed and shaped to fit over existing liner hangers and may not require modification of the outer diameter or profile of the liner hanger in some examples. Alternatively, the liner hanger may be manufactured to comprise a recess in which the reactive metal sealing element may be disposed. The recess may be of sufficient dimensions and geometry to retain the reactive metal sealing elements in the recess. In alternative examples, the reactive metal sealing element may be cast onto the conduit body of the liner hanger. In some alternative examples, the diameter of the reactive metal sealing element may be reduced (e.g., by swaging) when disposed on the conduit body of the liner hanger.

In some optional examples, the reactive metal sealing element may include a removable barrier coating. The removable barrier coating may be used to cover the exterior surfaces of the reactive metal sealing element and prevent contact of the reactive metal with the reaction-inducing fluid. The removable barrier coating may be removed when the sealing operation is to commence. The removable barrier coating may be used to delay sealing and/or prevent premature sealing with the reactive metal sealing element. Examples of the removable barrier coating include, but are not limited to, any species of plastic shell, organic shell, paint, dissolvable coatings (e.g., solid magnesium compounds or an aliphatic polyester), a meltable material (e.g., with a melting temperature less than 550 F), or any combination thereof. When desired, the removable barrier coating may be removed from the sealing element with any sufficient method. For example, the removable barrier coating may be removed through dissolution, a phase change induced by changing temperature, corrosion, hydrolysis, melting, or the removable barrier coating may be time-delayed and degrade after a desired time under specific wellbore conditions.

In some optional examples, the reactive metal sealing element may include an additive which may be added to the reactive metal sealing element during manufacture as a part of the composition, or the additive may be coated onto the reactive metal sealing element after manufacturing. The additive may alter one or more properties of the reactive metal sealing element. For example, the additive may improve sealing, add texturing, improve bonding, improve gripping, etc. Examples of the additive include, but are not limited to, any species of ceramic, elastomer, glass, non-reacting metal, the like, or any combination.

The reactive metal sealing element may be used to form a seal between any adjacent surfaces that are proximate to the reactive metal sealing elements. Without limitation, the reactive metal sealing elements may be used to form seals on casing, formation surfaces, cement sheaths or layers, and the like. For example, a reactive metal sealing element may be used to form a seal between the outer diameter of the liner hanger and a surface of an adjacent casing. Alternatively, the reactive metal sealing element may be used to form a seal between the outer diameter of the liner hanger and a surface of an adjacent set cement layer. As another example, a reactive metal sealing element may be used to form a seal between the liner hanger and the outer diameter of a tie-back liner. Moreover, a plurality of the reactive metal sealing elements may be used to form multiple seals between adjacent surfaces. As many reactive metal sealing elements may be provided as needed to form the desired sealing and anchoring of the liner hanger.

As described above, the reactive metal sealing elements comprise reactive metals and as such, they are non-elastomeric materials. As non-elastomeric materials, the reactive metal sealing elements do not possess elasticity, and therefore, they may irreversibly expand when contacted with a reaction-inducing fluid. The reactive metal sealing elements may not return to their original size or shape even after the reaction-inducing fluid is removed from contact.

Generally, the reaction-inducing fluid induces a reaction in the reactive metal to form a reaction product that occupies more space than the unreacted reactive metal. Examples of the reaction-inducing fluid include, but are not limited to, saltwater (e.g., water containing one or more salts dissolved therein), brine (e.g., saturated saltwater, which may be produced from subterranean formations), seawater, or any combination thereof. Generally, the reaction-inducing fluid may be from any source provided that the fluid does not contain an excess of compounds that may undesirably affect other components in the sealing element. In the case of saltwater, brines, and seawater, the reaction-inducing fluid may comprise a monovalent salt or a divalent salt. Suitable monovalent salts may include, for example, sodium chloride salt, sodium bromide salt, potassium chloride salt, potassium bromide salt, and the like. Suitable divalent salt can include, for example, magnesium chloride salt, calcium chloride salt, calcium bromide salt, and the like. In some examples, the salinity of the reaction-inducing fluid may exceed 10%. Advantageously, the reactive metal sealing elements of the present disclosure may not be impacted by contact with high-salinity fluids. One of ordinary skill in the art, with the benefit of this disclosure, should be readily able to select a reaction-inducing fluid for inducing a reaction with the reactive metal sealing elements.

The reactive metal sealing elements may be used in high-temperature formations (e.g., in formations with zones having temperatures equal to or exceeding 350° F.). Advantageously, the use of the reactive metal sealing elements of the present disclosure may not be impacted in high-temperature formations. In some examples, the reactive metal sealing elements may be used in both high-temperature formations and with high-salinity fluids. In a specific example, a reactive metal sealing element may be positioned on a liner hanger and used to form a seal after contact with a brine having a salinity of 10% or greater while also being disposed in a wellbore zone having a temperature equal to or exceeding 350° F.

FIG. 1 is a cross-section of an example tubing system, generally 5, for a wellbore 10 penetrating a subterranean formation 15. The tubing system 5 comprises a surface casing 20 and a surface cement sheath 25 descending from the surface 30. The tubing system 5 further comprises an intermediate casing 35 and intermediate cement sheath 40 deployed and nested concentrically within the surface casing 20. Although only one layer of intermediate casing 35 is illustrated, it is to be understood that more than one layer of intermediate casing 35 may be deployed in any example. A liner hanger 45 is deployed within the intermediate casing 35. The liner hanger 45 may be used to suspend a liner 55 from within the intermediate casing 35. The liner 55 may be any conduit suitable for suspension within the wellbore 10. The liner hanger 45 comprises a conduit body 60. The liner 55 is a conduit that does not run to the surface 30. The liner hanger 45 seals within the intermediate casing 35 allowing the liner 55 to functionally act as an extension of the intermediate casing 35 without having to extend to the surface 30 as a separate casing string would.

Figure 2:
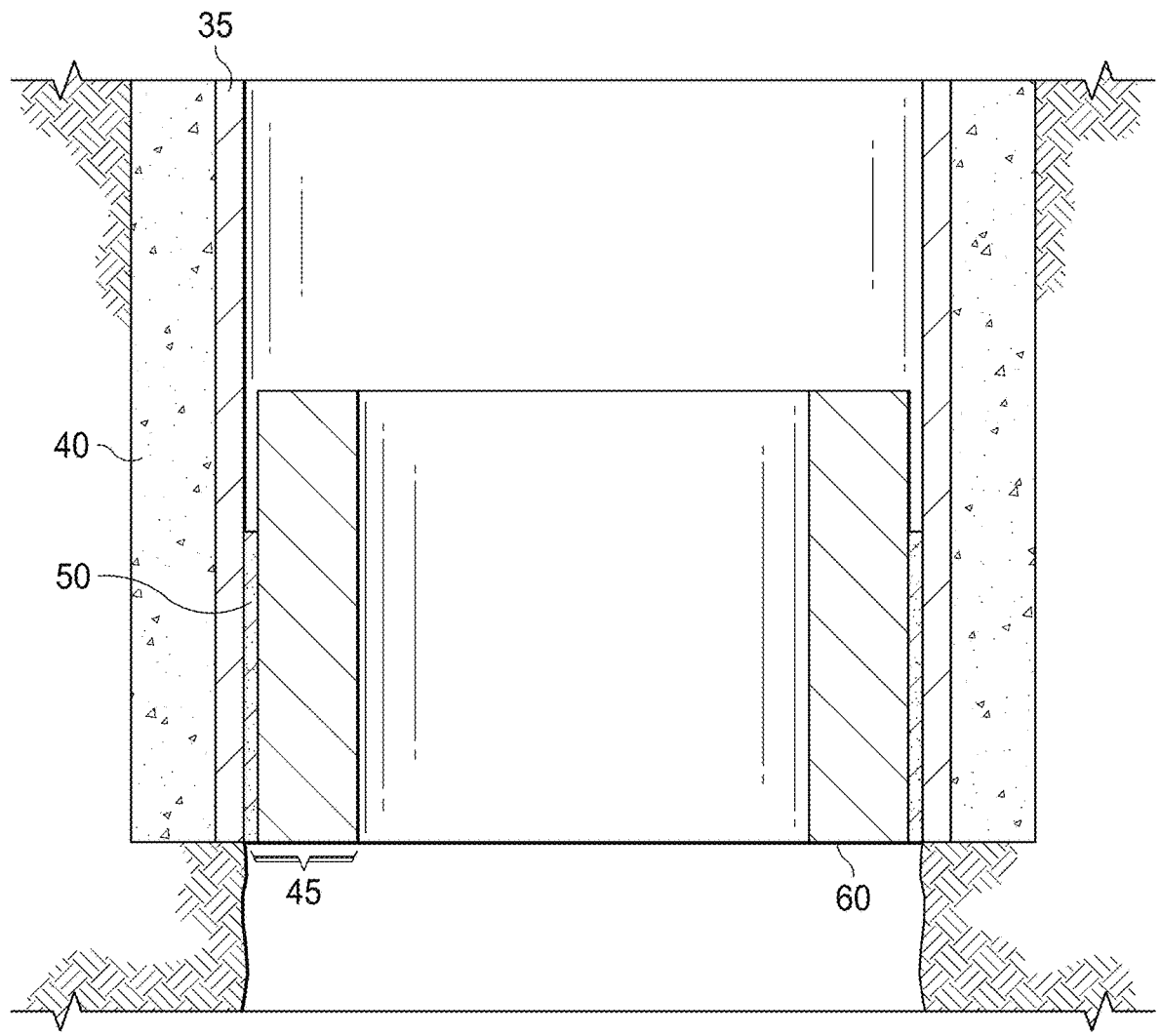
FIG. 2 is an enlarged cross-section illustrating a portion of the example liner hanger system of FIG. 1 in accordance with the examples disclosed herein.

FIG. 2 is an enlarged cross-section of a portion of the example tubing system 5 of FIG. 1. Intermediate casing 35 extends from the surface (i.e., surface 30 as illustrated in FIG. 1) and may be held in place with the intermediate cement sheath 40. Although only one layer of intermediate casing 35 is illustrated, it is to be understood that as many layers of intermediate casing 35 may be used as desired. Any subsequent layers of the intermediate casing 35 may be nested concentrically within one another within the illustrated intermediate casing 35. The liner hanger 45 is deployed within the intermediate casing 35. The liner hanger 45 may be any species of non-expandable liner hanger. By non-expandable, it is understood that the diameter and circumference of the conduit body 60 is not increased via an expansion operation, such as the running of an expansion cone or other means of expansion. The liner hanger 45 suspends a liner (i.e., liner 55 as illustrated in FIG. 1). The liner hanger 45 is anchored to the intermediate casing 35 with a reactive metal sealing element 50 after the reactive metal sealing element 50 has reacted and expanded. The reactive metal sealing element 50 is disposed on and around the conduit body 60 of the liner hanger 45. The reactive metal sealing element 50 forms an external seal with the adjacent interior surface of the intermediate casing 35 after the reactive metal sealing element 50 has reacted and expanded. The reactive metal sealing element 50 expands after exposure to a reaction-inducing fluid. The reactive metal sealing element 50 reacts to produce the expanded metal reaction product described above. As the expanded metal reaction product has a larger volume than the unreacted base reactive metal, the reactive metal sealing element 50 is able to expand and form an annular seal at the interface of the adjacent surface of the intermediate casing 35 as described above. The reactive metal sealing element 50 may continue to expand until contact with the adjacent surface is made. The formed seal prevents wellbore fluid from bypassing the liner 55 and liner hanger 45.

It should be clearly understood that the examples illustrated by FIGS. 1-2 are merely general applications of the principles of this disclosure in practice, and a wide variety of other examples are possible. Therefore, the scope of this disclosure is not limited in any manner to the details of any of the FIGURES described herein.

Figure 3:
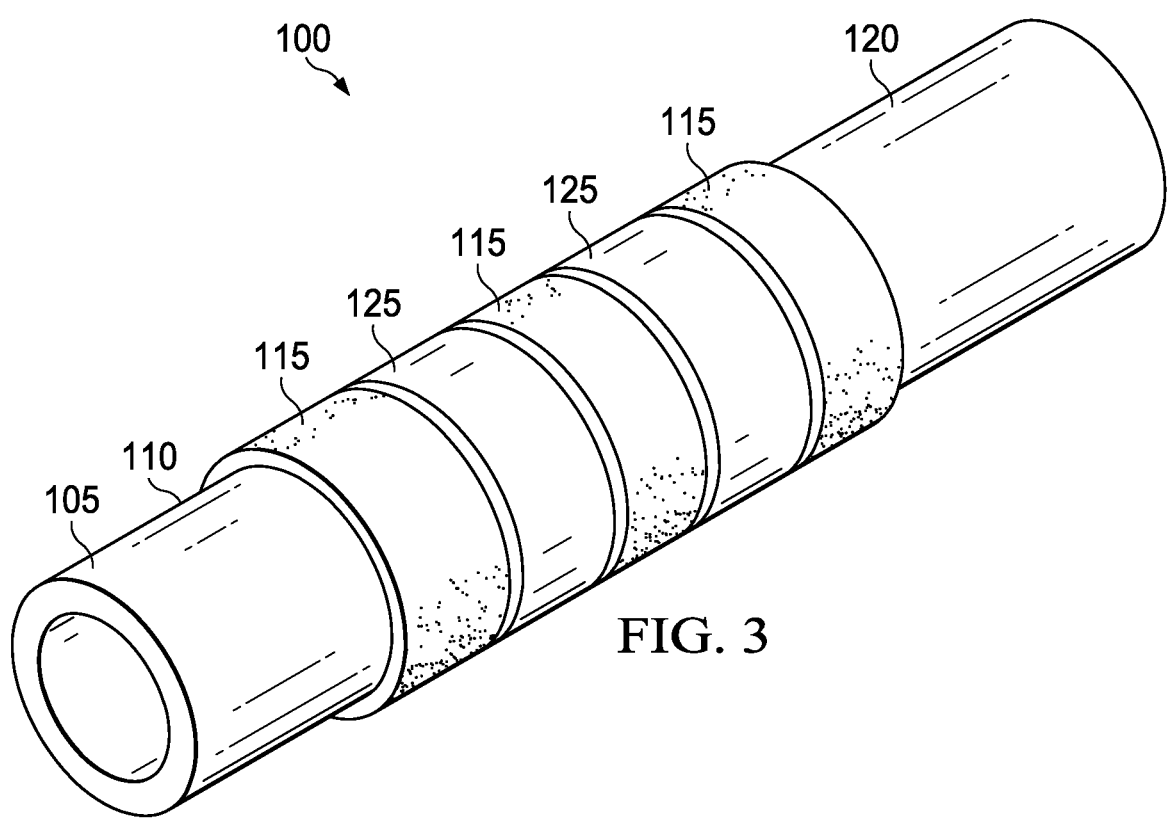
FIG. 3 is a perspective illustration of a liner hanger in accordance with the examples disclosed herein.

FIG. 3 is an isometric illustration of a liner hanger, generally 100. The liner hanger 100 couples to and forms a seal inside a casing at a coupling end 105. The liner hanger 100 comprises a conduit body 110. Reactive metal sealing elements 115 form external seals to seal against the surface of the casing and anchor the liner hanger 100 to the casing. A liner (not illustrated) may be coupled to and suspended from a suspending end 120. Spacer elements 125 may be positioned on the conduit body 110. The spacer elements 125 may be a polymer-based material or a metal, such as steel. The spacer elements 125 may provide additional anchoring support to the liner hanger 100 within a fixed location or may space other conduit body 110 components such as multiple reactive metal sealing elements 115.

In the illustrated example of FIG. 3, the reactive metal sealing elements 115 and the spacer elements 125 alternate in a series. It is to be understood that the reactive metal sealing elements 115 may be placed in any pattern or configuration, either by itself or in conjunction with other components, such as other species of spacer elements 125. As an example, a single reactive metal sealing element 115 may be used. As another example, multiple reactive metal sealing elements 115 may be used. As a further example, multiple reactive metal sealing elements 115 may be used in a series adjacent to one another with individual other species of spacer elements 125 placed at any point of the series. In some examples, multiple other species of spacer elements 125 may be placed at the ends of the series. As another example, the multiple reactive metal sealing elements 115 may alternate in the series with other species of spacer elements 125. In some additional examples, the spacer elements 125 may be placed on the conduit body 110 in a location that is not proximate to the reactive metal sealing elements 115. For example, the spacer elements 125 may be placed on the opposing side of a retaining element or pair of retaining elements such as cup seals, end rings, stamped rings, etc. which may have a reactive metal sealing element 115 or series of reactive metal sealing elements 115 disposed on the other side or therebetween.

It should be clearly understood that the example illustrated by FIG. 3 is merely a general application of the principles of this disclosure in practice, and a wide variety of other examples are possible. Therefore, the scope of this disclosure is not limited in any manner to the details of any of the FIGURES described herein.

Figure 4:
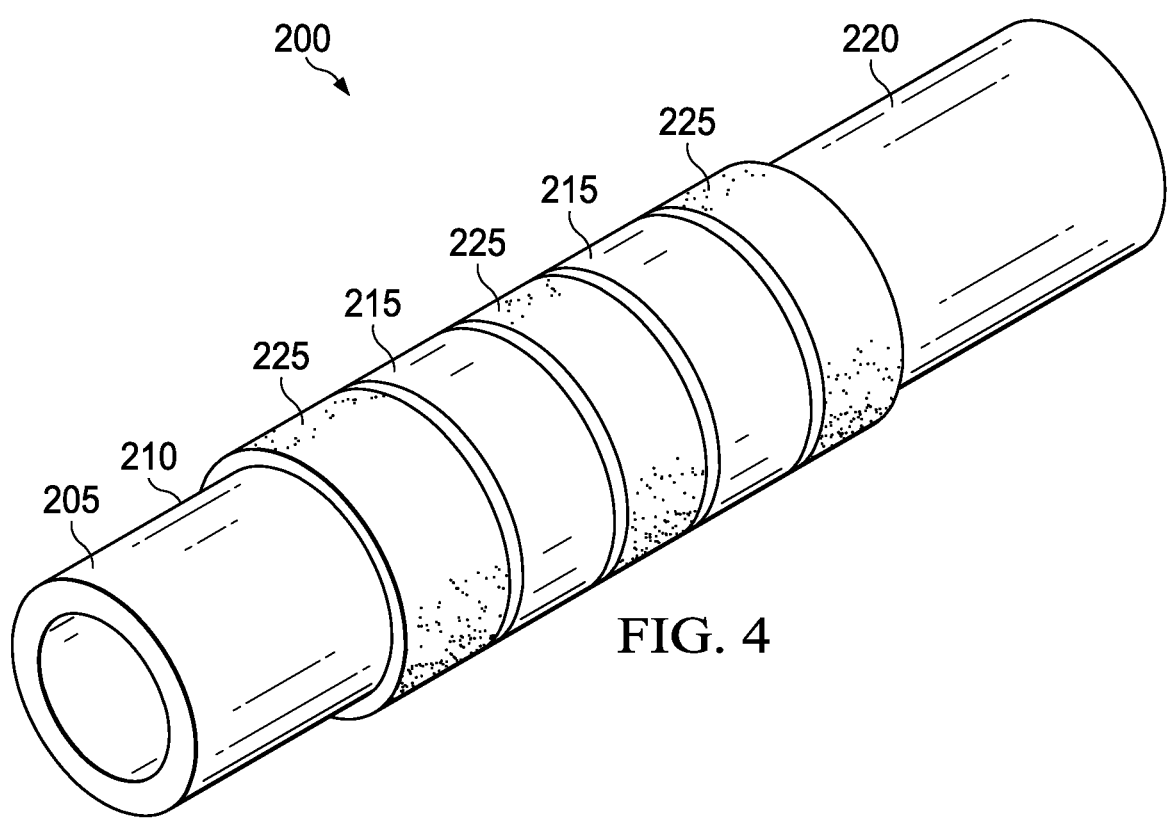
FIG. 4 is a perspective illustration of a liner hanger in accordance with the examples disclosed herein.

FIG. 4 is an isometric illustration of a liner hanger, generally 200. The liner hanger 200 couples to and forms a seal inside a casing at a coupling end 205. The liner hanger 200 comprises a conduit body 210. Reactive metal sealing elements 215 form external seals to seal against the surface of the casing and anchor the liner hanger 200 to the casing. A liner (not illustrated) may be coupled to and suspended from a suspending end 220. Elastomeric sealing elements 225 may be positioned on the ends of and in-between the reactive metal sealing elements 215 to prevent the applied pressure from extruding the seal formed from the reactive metal sealing elements 215 in the direction of said applied pressure, and also to supplement the sealing of the reactive metal sealing elements 215. In some alternative examples, the elastomeric sealing elements 225 may be replaced with other species of sealing elements such as non-reactive metal sealing elements. In some other alternative examples, the elastomeric sealing elements 225 may be replaced with retaining rings as discussed above.

In the illustrated example of FIG. 4, the reactive metal sealing elements 215 and the elastomeric sealing elements 225 alternate in a series. It is to be understood that the reactive metal sealing elements 215 may be placed in any pattern or configuration, either by itself or in conjunction with other components such as other species of sealing elements (e.g., the elastomeric sealing elements 225 or non-reactive metal sealing elements) or retaining elements. As an example, a single reactive metal sealing element 215 may be used. As another example, multiple reactive metal sealing elements 215 may be used. As a further example, multiple reactive metal sealing elements 215 may be used in a series adjacent to one another with individual other species of sealing elements or retaining elements placed at the ends of the series. Further to this example, multiple other species of sealing elements or retaining elements may be placed at the ends of the series. As another example, the multiple reactive metal sealing elements 215 may alternate in the series with the other species of sealing elements or retaining elements. In some additional examples, the other species of sealing or retaining elements may be placed on the conduit body 110 in a location that is not proximate to the reactive metal sealing elements 215. For example, the other species of elastomeric sealing elements 225 may be placed on the opposing side of a retaining element or pair of retaining elements such as cup seals, end rings, stamped rings, etc. which may have a reactive metal sealing element 215 or series of reactive metal sealing elements 215 disposed on the other side or therebetween.

The elastomeric sealing elements 225 may be any species of polymer. In one example, the elastomeric sealing elements 225 are a swellable elastomer and may comprise any oil-swellable, water-swellable, and/or combination of swellable non-metal material as would occur to one of ordinary skill in the art. The swellable elastomeric sealing elements 225 may swell when exposed to a swell-inducing fluid (e.g., an oleaginous or aqueous fluid). Generally, the elastomeric sealing elements 225 may swell through diffusion whereby the swell-inducing fluid is absorbed into the structure of the elastomeric sealing elements 225 where a portion of the swell-inducing fluid may be retained. The swell-inducing fluid may continue to diffuse into elastomeric sealing elements 225, causing the elastomeric sealing elements 225 to swell until they contact an adjacent surface. The elastomeric sealing elements 225 may work in tandem with the reactive metal sealing elements 215 to create a differential annular seal around the liner hanger 200.

It should be clearly understood that the example illustrated by FIG. 4 is merely a general application of the principles of this disclosure in practice, and a wide variety of other examples are possible. Therefore, the scope of this disclosure is not limited in any manner to the details of any of the FIGURES described herein.

Figure 5:
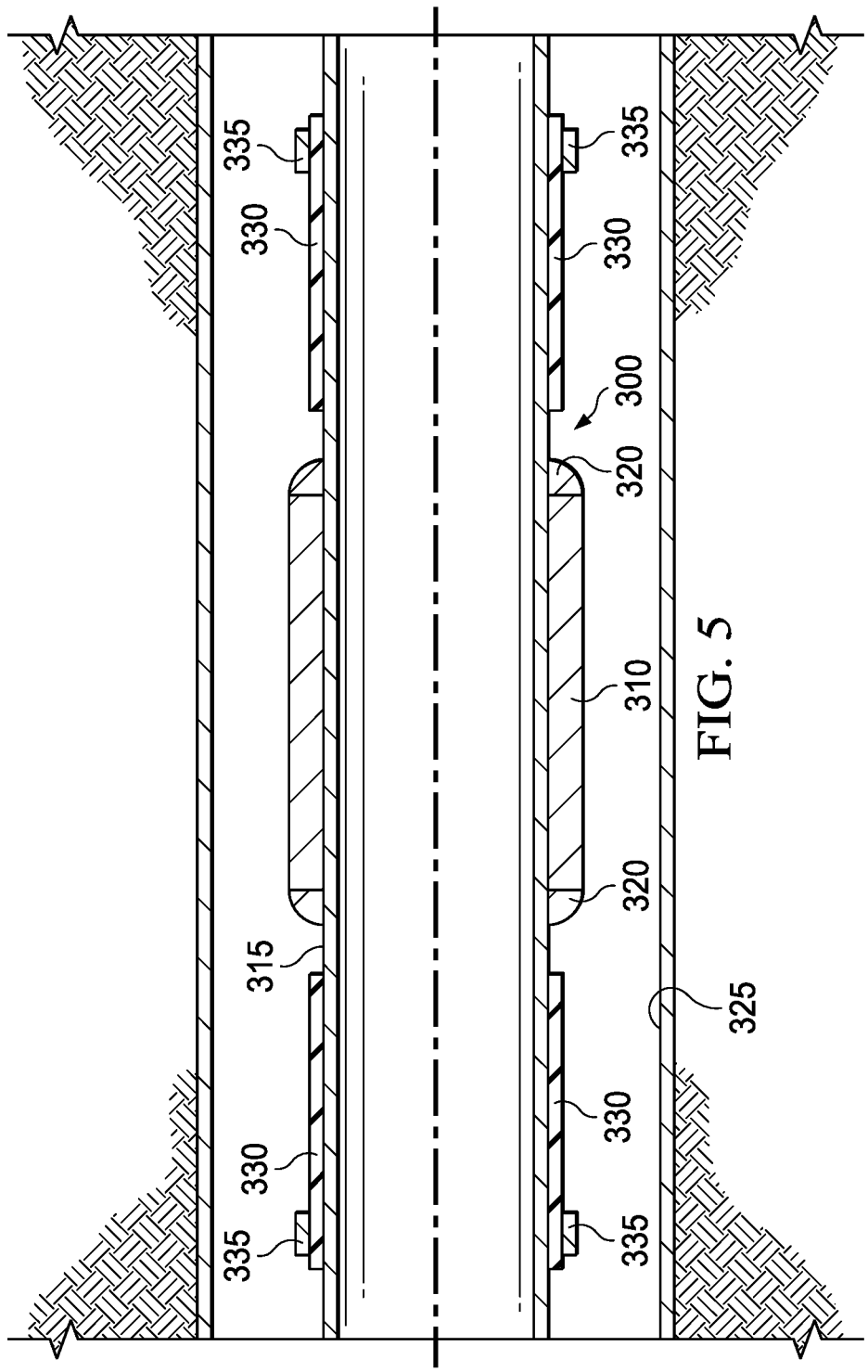
FIG. 5 is a cross-section illustrating an example liner hanger in accordance with the examples disclosed herein.

FIG. 5 is a cross-section illustration of an example liner hanger 300. Liner hanger 300 comprises a reactive metal sealing element 310 disposed on a conduit body 315. The reactive metal sealing element 310 may be held in place on the conduit body 315 with end rings 320. End rings 320 are optional and may be substituted for other elements sufficient to maintain the reactive metal sealing element 310 in position when the liner hanger 300 is introduced downhole. For example, the reactive metal sealing element 310 may be held in place with set screws or may be disposed in a recess precluding the need for any species of retaining ring or other retaining element. In alternative examples, no retaining means may be provided and the reactive metal sealing element 310 may move freely on the conduit body 315. The reactive metal sealing element 310 may seal against surface 325, illustrated as a surface of an intermediate casing, but may also be the surface of a set cement layer. Surface 325 is proximate to the reactive metal sealing element 310. Retaining elements 330 are located downstream of the reactive metal sealing element 310. In the illustrated example, the retaining elements 330 are positioned on both sides of the reactive metal sealing element 310. Retaining elements 330 may be positioned on both sides of the reactive metal sealing element 310 when bi-directional flow is anticipated. As such, there is a retaining element 30 downstream of the reactive metal sealing element 310 when flow occurs in either the uphole or downhole direction. Restraints 335 may be positioned on or around retaining element 330 to restrain retaining element 330 while the liner hanger 300 is run in hole. Restraints 335 may be a band, clamp, strip, etc. comprising a degradable material. The degradable material may include, but is not limited to, a dissolvable salt, a dissolvable metal, a meltable material, a degradable polymer, and any combination of materials. The restraints 335 may also take other forms, including threaded or bolted connections, so long as the removal of the connections does not impact the ability of the retaining element 330 to retain the reaction products produced from the reactive metal sealing element 310 reaction. The restraints 335 may degrade over time in the wellbore environment or may be actively degraded chemically with a wellbore fluid, acid, or a solvent. In some examples, the restraints 335 may comprise a different reactive metal than the reactive metal sealing element 310, and specifically may comprise a reactive metal that reacts at a faster rate than the reactive metal of the reactive metal sealing element 310. The restraints 335 may be configured to comprise a degradable material that is removed faster than the reaction rate of the reactive metal sealing element 310. As such, the restraints 335 are removed at a sufficiently fast rate to allow the retaining elements 330 to actuate in position to prevent the washout of the reaction products.

Figure 6:
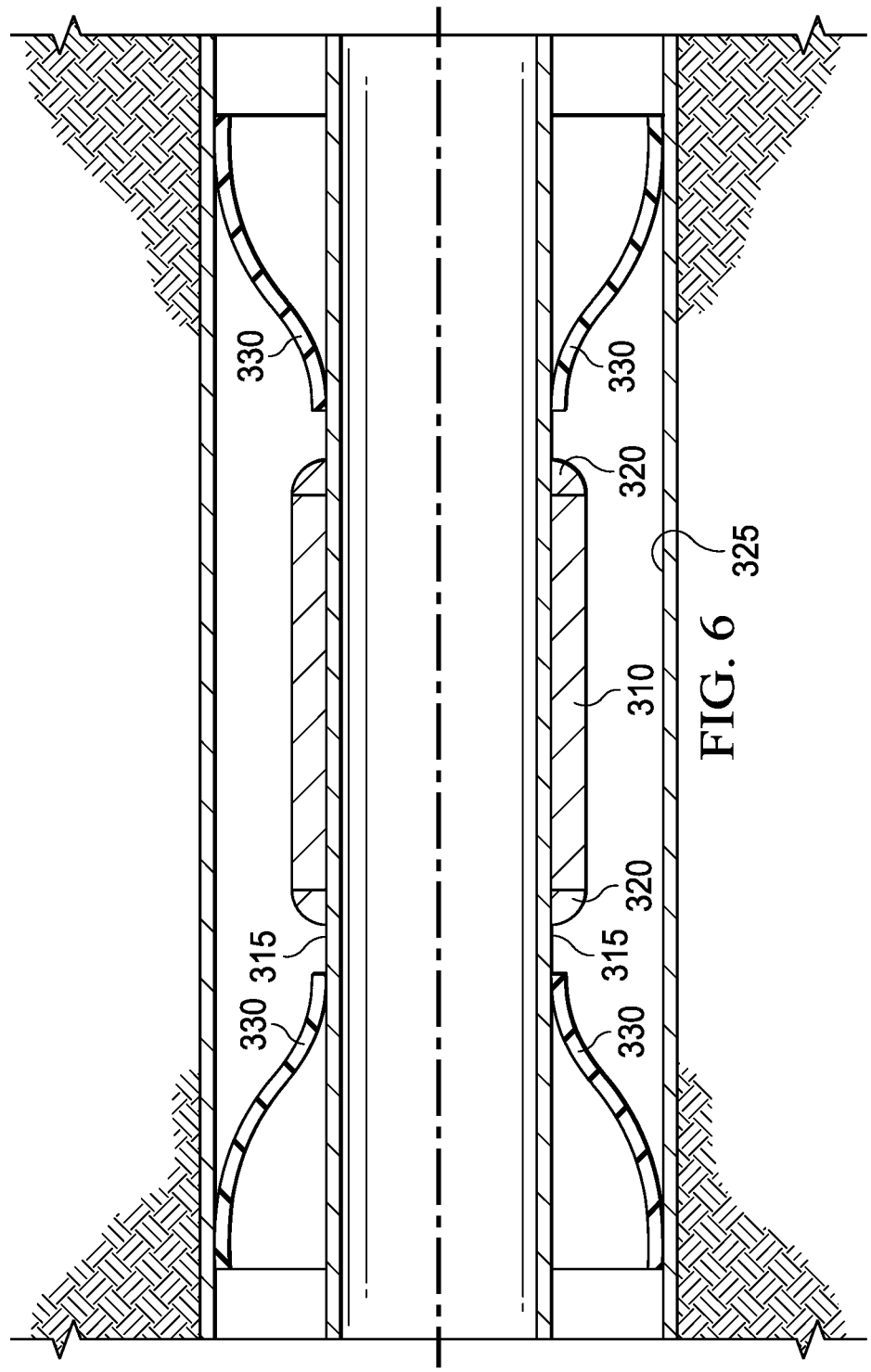
FIG. 6 is a cross-section further illustrating the example liner hanger system of FIG. 5 in accordance with the examples disclosed herein.

FIG. 6 is a cross-section illustration of the example liner hanger 300 of FIG. 5 after actuation of the retaining elements 330. After removal of restraints 335 via degradation, the retaining elements 330 may be actuated to expand outward. As illustrated, the retaining elements 330 comprise cup seals, but may comprise other species of retaining elements 330 in other examples. Retaining elements 330 may be biased to spring out on its own, it may be spring energized, or it may be flow energized. In spring energized examples, the retaining elements 330 may be actuated by the spring force of an internal spring released upon removal of restraint 335. In flow energized examples, the retaining elements 330 may be energized through fluid flow into the retaining elements 330 to force them open. Once actuated, the retaining elements 330 may prevent the washout of the reaction products formed from the reaction of the reactive metal sealing element 310 and a reaction-inducing fluid. Washout may be prevented by the retaining elements 330 forming a seal to trap and retain the reaction products such that they do not flow downstream past the retaining elements 330. In some optional examples, the retaining elements 330 may be porous and may allow fluid flow therethrough while still retaining the reaction products. In some other optional examples, the retaining elements 330 may not be porous. The reaction products may then aggregate and to seal against the adjacent surface 325. The retaining elements 330 may be degraded if desired. In other examples, the retaining elements 330 may be permanent.

In the illustrated examples of FIGS. 5 and 6, the reactive metal sealing elements 310 are illustrated as disposed between a pair of retaining elements 330. It is to be understood that the reactive metal sealing elements 310 may be placed in any pattern or configuration with the retaining elements 330. As an example, multiple reactive metal sealing elements 310 may alternate in the series with the retaining elements 330. In some additional examples, the retaining elements 330 may be placed on the conduit body 315 in a location that is not proximate to the reactive metal sealing elements 310. For example, the retaining elements 330 may be placed on the opposing side of another species of retaining element or pair of retaining elements such as end rings, stamped rings, etc. which may have a reactive metal sealing element 310 or series of reactive metal sealing elements 310 disposed on the other side or therebetween. In an alternative example, a retaining element 330, such as a cup seal, may be disposed within a series of reactive metal sealing elements 310 disposed on the conduit body 315 of the liner hanger 300.

It should be clearly understood that the example illustrated by FIGS. 5 and 6 are merely a general application of the principles of this disclosure in practice, and a wide variety of other examples are possible. Therefore, the scope of this disclosure is not limited in any manner to the details of any of the FIGURES described herein.

Figure 7:
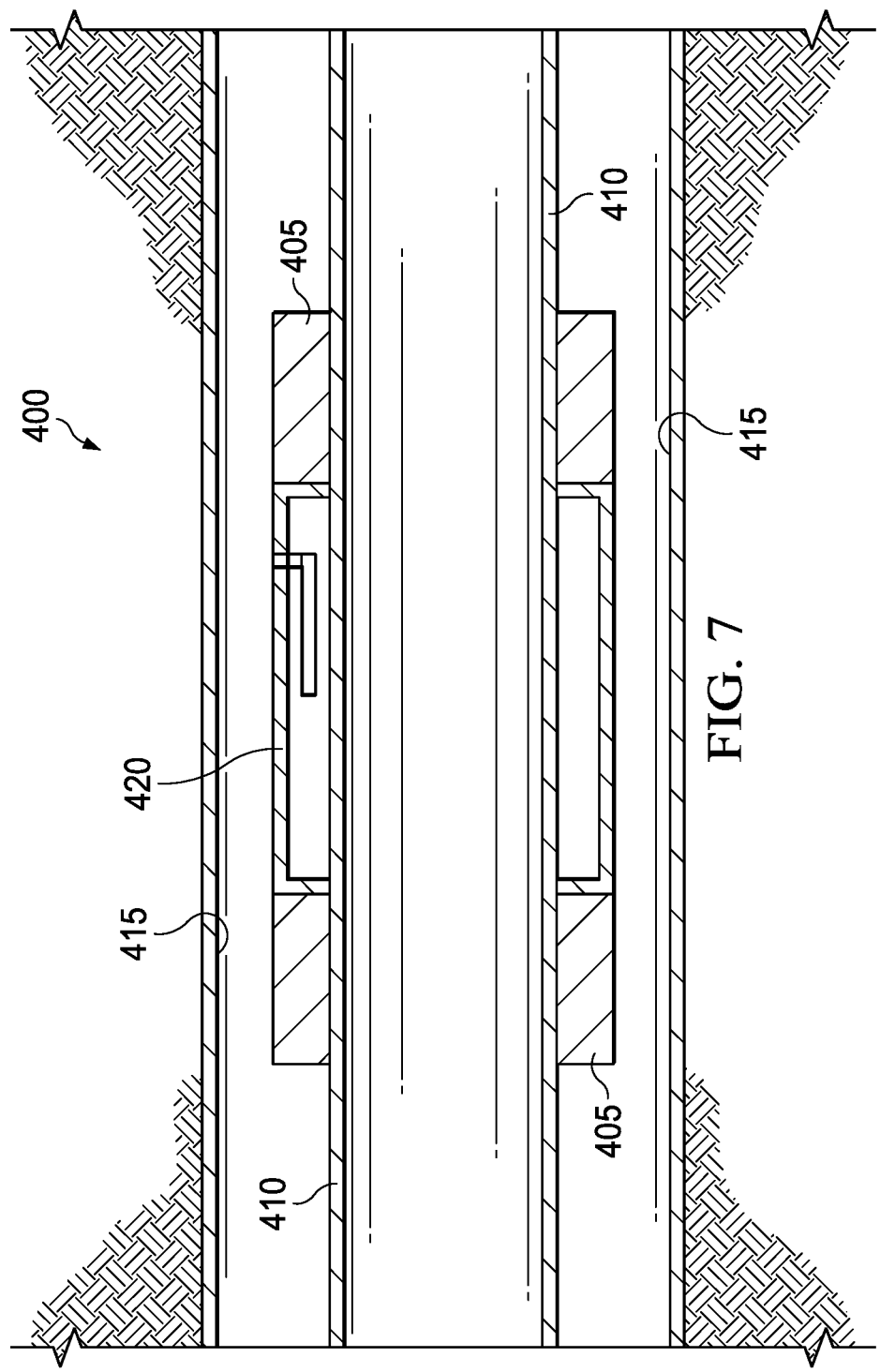
FIG. 7 is a cross-section illustration of a liner hanger with an accelerator in accordance with the examples disclosed herein.

FIG. 7 is a cross-section illustration of an example liner hanger 400. Liner hanger 400 comprises two reactive metal sealing elements 405 disposed on a conduit body 410. In some optional examples, the reactive metal sealing elements 405 may be held in place, before and/or after reaction, on the conduit body 410 by retaining elements such as the end rings or cup seals as discussed above. The reactive metal sealing elements 405 may seal against surface 415, illustrated as a surface of an intermediate casing, but may also be the surface of a set cement layer. Surface 415 is proximate to the reactive metal sealing elements 405. Accelerator 420 is located between the reactive metal sealing elements 405. In the illustrated example of FIG. 7, the accelerator 420 is a heating element which provides heat to the reactive metal sealing elements 405 to accelerate the sealing and anchoring process. The heating element of the accelerator 420 may be chemical activated or electrically activated. For example, wellbore fluids may react with materials within the heating element to produce an exothermic reaction which generates sufficient heat to accelerate the sealing and anchoring process of the reactive metal sealing elements 405. Alternatively, the heating element may be a heater powered by a power source such as a battery or electrical cable. In all examples, the accelerator 420 may be remotely activated, time delayed, or wirelessly activated as desired.

In the illustrated example of FIG. 7, the reactive metal sealing elements 405 are illustrated as disposed on either side of the accelerator 420. It is to be understood that the reactive metal sealing elements 405 may be placed in any pattern or configuration with the accelerator 420 as well as any additional elements which may be present such as retaining elements, spacer elements, etc. As an example, multiple reactive metal sealing elements 405 may alternate in the series with an accelerator 420 or accelerators 420.

It should be clearly understood that the example illustrated by FIG. 7 is merely a general application of the principles of this disclosure in practice, and a wide variety of other examples are possible. Therefore, the scope of this disclosure is not limited in any manner to the details of any of the FIGURES described herein.

Figure 8:
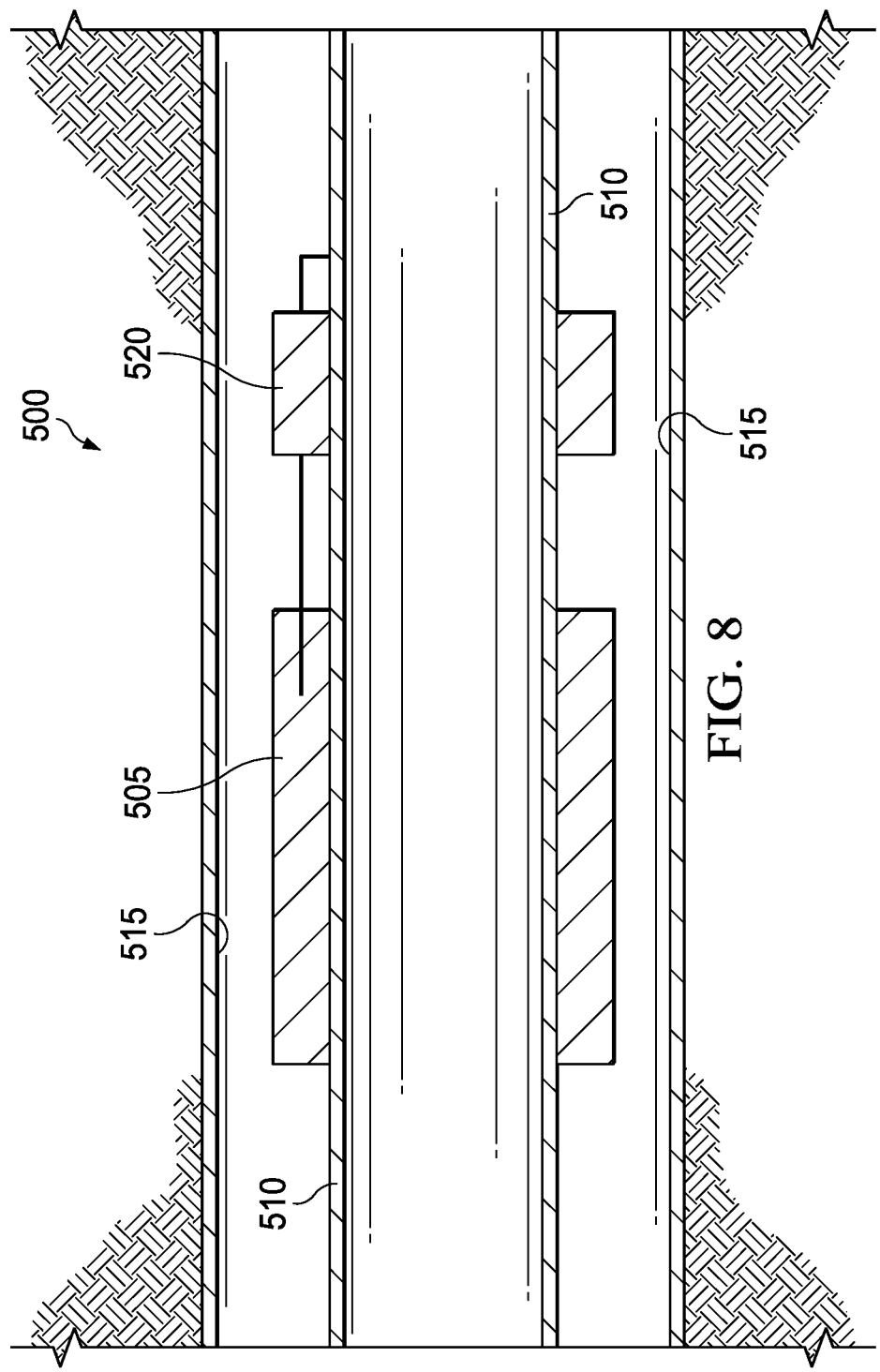
FIG. 8 is a cross-section illustration of a liner hanger with an accelerator in accordance with the examples disclosed herein.

FIG. 8 is a cross-section illustration of an example liner hanger 500. Liner hanger 500 comprises a reactive metal sealing element 505 disposed on a conduit body 510. In some optional examples, the reactive metal sealing element 505 may be held in place, before and/or after reaction, on the conduit body 510 by retaining elements such as the end rings or cup seals discussed above. The reactive metal sealing element 505 may seal against surface 515, illustrated as a surface of an intermediate casing, but may also be the surface of a set cement layer. Surface 515 is proximate to the reactive metal sealing element 505. Accelerator 520 is proximate to the reactive metal sealing element 505. In the illustrated example of FIG. 8, the accelerator 520 is a voltage element which provides an electrical current to the reactive metal sealing element 505 to accelerate the sealing and anchoring process. The voltage element of the accelerator 520 may be electrically activated by a power source such as a battery or electrical cable. In all examples, the accelerator 520 may be remotely activated, time delayed, or wirelessly activated as desired.

In the illustrated example of FIG. 8, the reactive metal sealing element 505 is illustrated as disposed on one side of the accelerator 520. It is to be understood that the reactive metal sealing element 505 may be placed in any pattern or configuration with the accelerator 520 as well as any additional elements which may be present such as retaining elements, spacer elements, etc. As an example, multiple reactive metal sealing elements 505 may alternate in the series with an accelerator 420 or accelerators 420.

It should be clearly understood that the example illustrated by FIG. 8 is merely a general application of the principles of this disclosure in practice, and a wide variety of other examples are possible. Therefore, the scope of this disclosure is not limited in any manner to the details of any of the FIGURES described herein.

Figure 9:
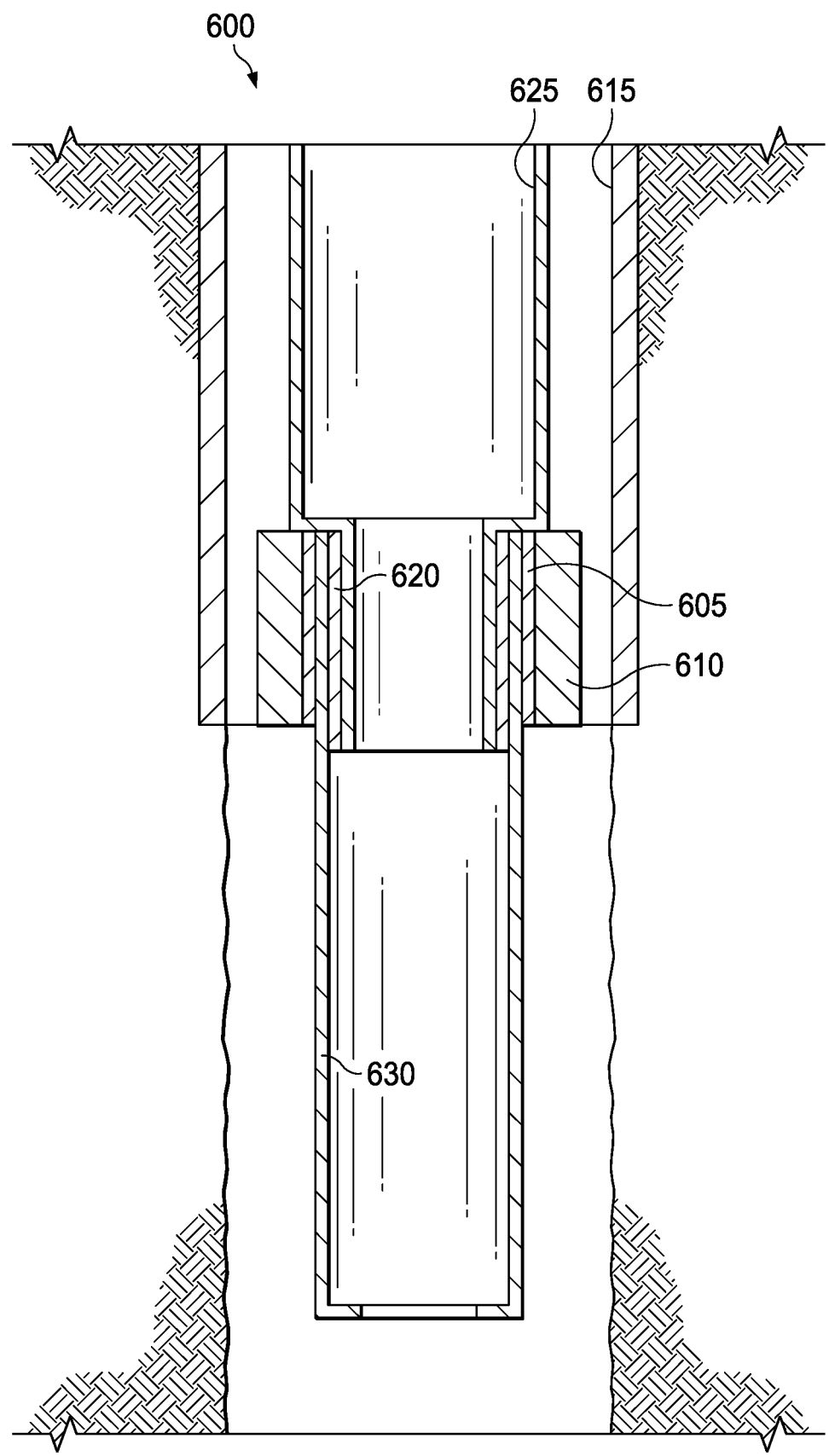
FIG. 9 is a cross-section illustration of a liner hanger and an installation string with an accelerator in accordance with the examples disclosed herein.

FIG. 9 is a cross-section illustration of an example wellbore system, generally 600, which comprises liner hanger 605. Liner hanger 605 comprises a reactive metal sealing element 610. The reactive metal sealing element 610 seals against surface 615, illustrated as a surface of an intermediate casing, but may also be the surface of a set cement layer. Surface 615 is proximate to the reactive metal sealing element 610. Accelerator 620 has been deployed on the installation string 625. The accelerator 620 is positioned proximate to the reactive metal sealing element 610 to accelerate the sealing and anchoring process of the reactive metal sealing element 610. The accelerator 620 may be a heating or voltage element as described above and may be remotely activated, time delayed, or wirelessly activated as desired. Liner hanger 605 has a liner 630 suspended downhole. The installation string 625 is coupled to and installs the liner hanger 605, which has the liner 630 suspended therefrom. After the activation of the accelerator 620, the sealing and anchoring process of the reactive metal sealing element 610 proceeds to seal and anchor the liner hanger 605 to the surface 615. Upon completion, the installation string 625 is tugged by pulling on it from the surface 615. Tugging the installation string 625 may test whether the liner hanger 605 is successfully anchored to the surface 615. If the liner hanger 605 is verified as being successfully installed, the liner hanger 605 is decoupled from the installation string 625. The installation string 625, as well as the accelerator 620 disposed thereon, are then pulled uphole and removed from the wellbore.

It should be clearly understood that the example illustrated by FIG. 9 is merely a general application of the principles of this disclosure in practice, and a wide variety of other examples are possible. Therefore, the scope of this disclosure is not limited in any manner to the details of any of the FIGURES described herein.

Figure 10:
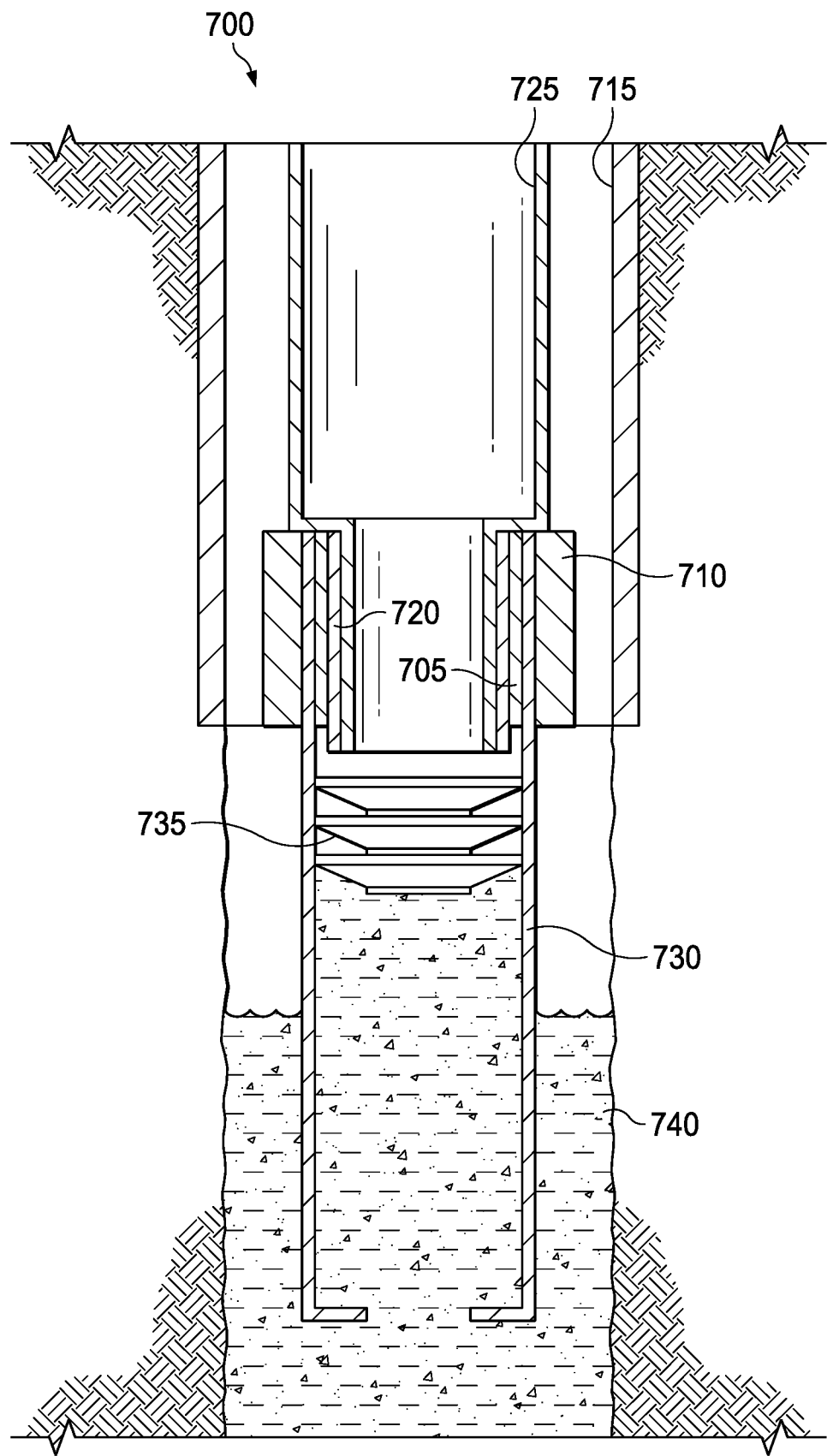
FIG. 10 is a cross-section illustration of a liner hanger system having an accelerator actuated by a wiper plug in accordance with the examples disclosed herein.

FIG. 10 is a cross-section illustration of an example wellbore system, generally 700, which comprises liner hanger 705. Liner hanger 705 comprises a reactive metal sealing element 710. The reactive metal sealing element 710 seals against surface 715, illustrated as a surface of an intermediate casing, but may also be the surface of a set cement layer. Surface 715 is proximate to the reactive metal sealing element 710. Accelerator 720 has been deployed on the installation string 725. The accelerator 720 is positioned proximate the reactive metal sealing element 710 to accelerate the sealing and anchoring process of the reactive metal sealing element 710. The accelerator 720 may be a heating or voltage element as described above. Liner hanger 705 has a liner 730 suspended downhole. The installation string 725 is coupled to and installs the liner hanger 705, which has the liner 730 suspended therefrom. In the illustration of FIG. 10, the activation of the accelerator 720 occurs when the wiper plug 735 or the preceding cement slurry 740 passes the accelerator 720. For example, the wiper plug 735 or preceding cement slurry 740 may trigger activation of the accelerator 720 by actuating a switch on the accelerator 720, chemical activation of a component within the accelerator 720, triggering a sensor within the accelerator 720, etc. In alternative examples, the wiper plug may be substituted for any species of a wide variety of tools that are similarly conveyed along the interior of the tubing string including darts, cementing plugs, balls, and wireline tools.

Figure 11:
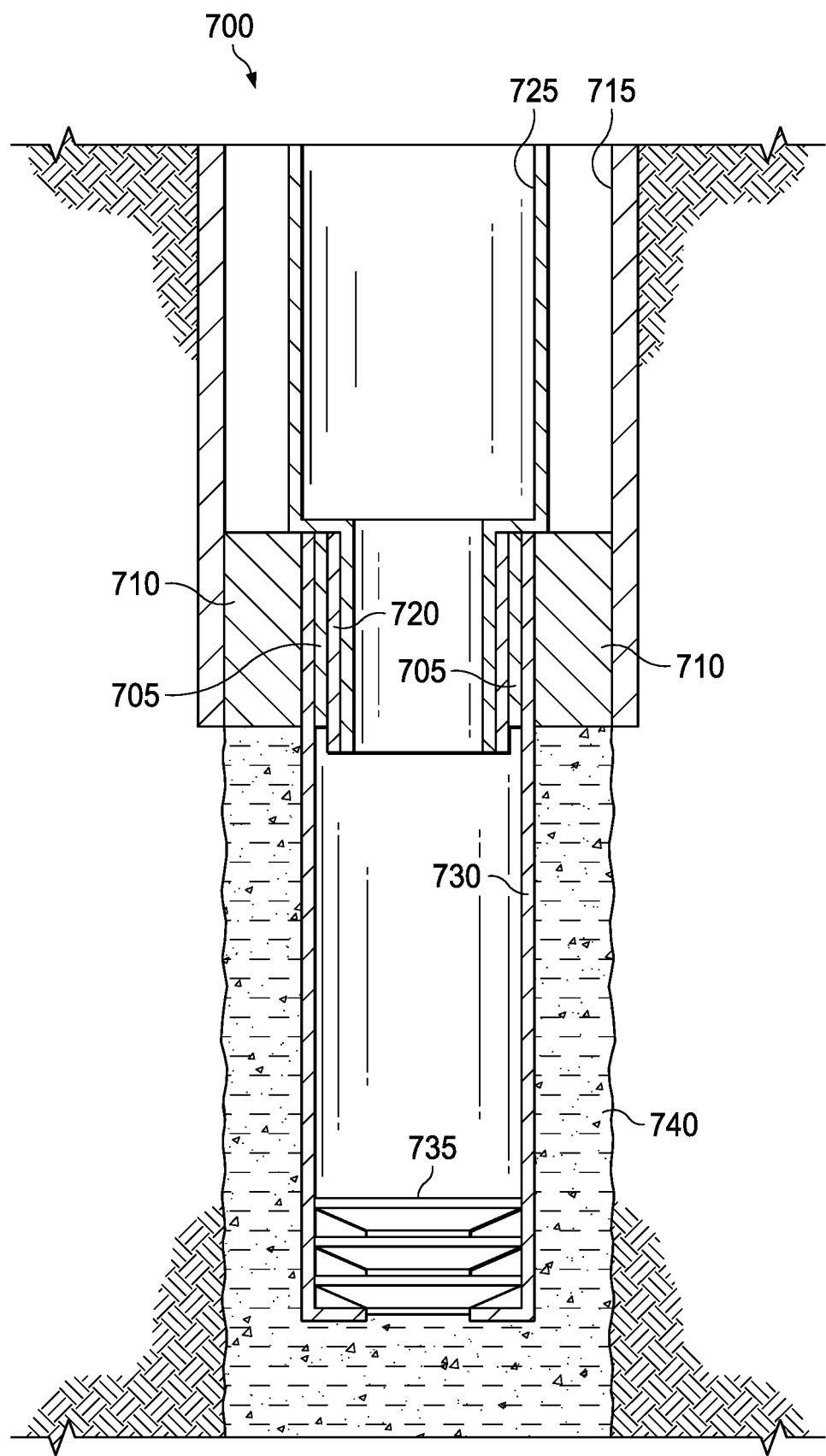
FIG. 11 is a cross-section further illustrating the example liner hanger system of FIG. 10 in accordance with the examples disclosed herein.

FIG. 11 is a cross-section illustrating the example wellbore system of 700 after the passage of the wiper plug 735 and the preceding cement slurry 740. The sealing and anchoring process of the reactive metal sealing element 710 has proceeded to seal and anchor the liner hanger 705 to the surface 715. The cement slurry 740 has also been positioned and may be in the process of setting and then sealing and anchoring the liner 730 in place. Upon completion, the installation string 725 is tugged by pulling on it from the surface. Tugging the installation string 725 may test whether the liner hanger 705 is successfully anchored to the surface 715.

Figure 12:
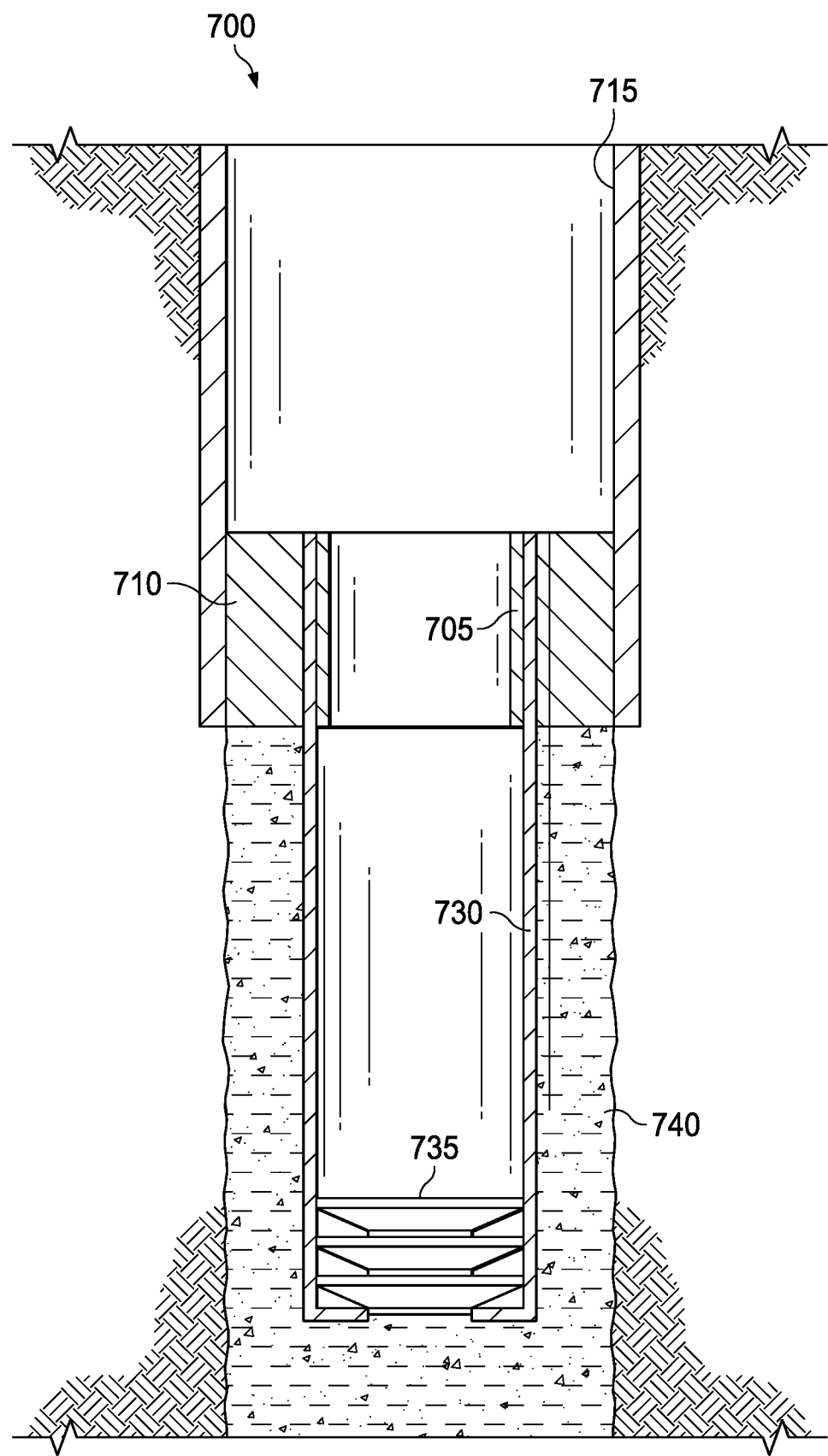
FIG. 12 is a cross-section further illustrating the example liner hanger system of FIG. 11 in accordance with the examples disclosed herein.

FIG. 12 is a cross-section illustrating the example wellbore system of 700 of FIG. 11 where the liner hanger 705 has been verified as being successfully installed and was decoupled from the installation string 725. The installation string 725, as well as the accelerator 720 disposed thereon, were pulled uphole and removed from the wellbore as illustrated by their absence from the illustration of FIG. 12.

It should be clearly understood that the example illustrated by FIGS. 10-12 is merely a general application of the principles of this disclosure in practice, and a wide variety of other examples are possible. Therefore, the scope of this disclosure is not limited in any manner to the details of any of the FIGURES described herein.

Figure 13:
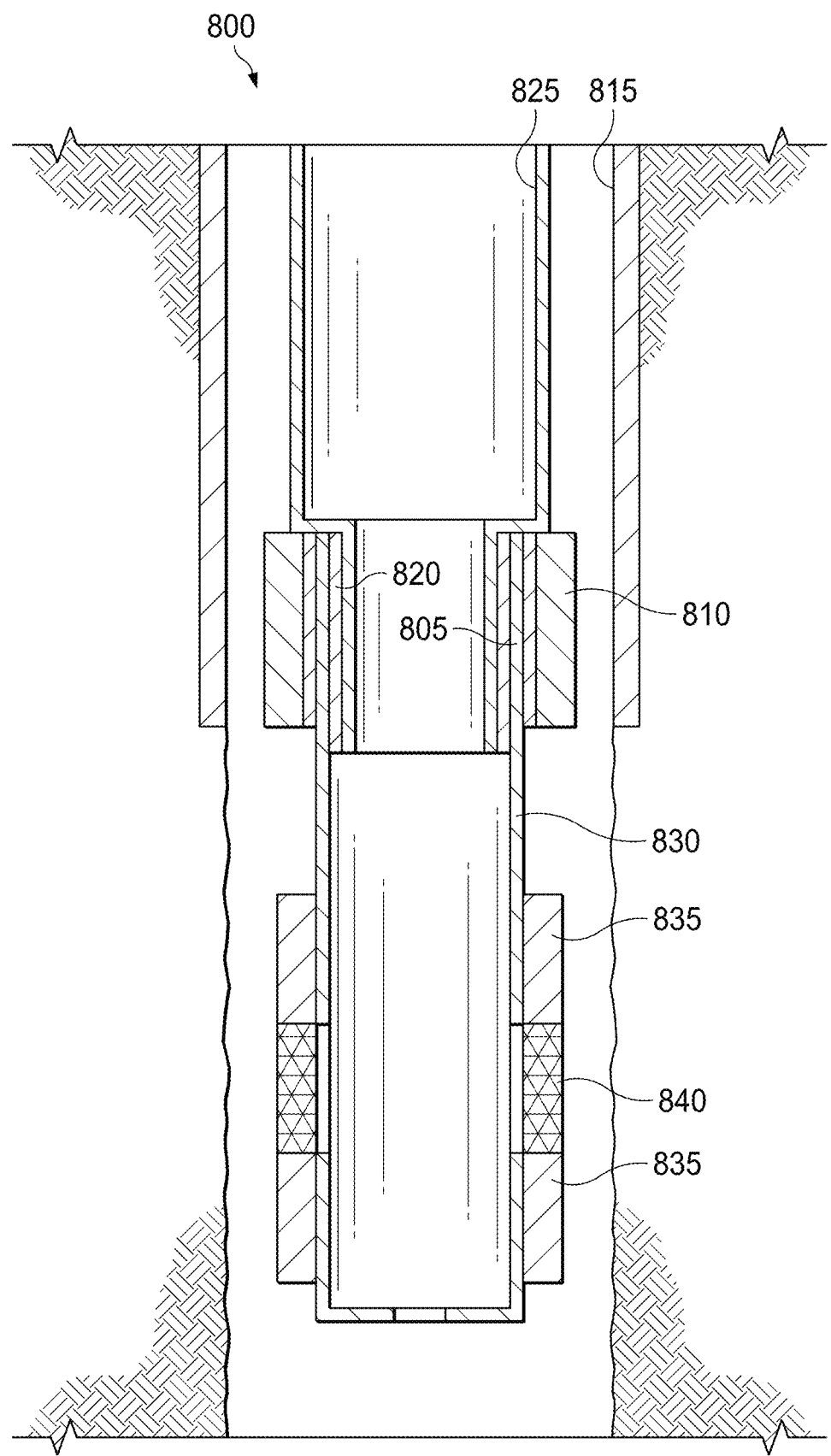
FIG. 13 is a cross-section illustration of a liner hanger system having reactive metal sealing elements disposed on the liner in accordance with the examples disclosed herein.

FIG. 13 is a cross-section illustration of an example wellbore system, generally 800, which comprises liner hanger 805. Liner hanger 805 comprises a reactive metal sealing element 810. The reactive metal sealing element 810 seals against surface 815, illustrated as a surface of an intermediate casing, but may also be the surface of a set cement layer. Surface 815 is proximate to the reactive metal sealing element 810. Accelerator 820 has been deployed on an installation string 825. The accelerator 820 is positioned proximate the reactive metal sealing element 810 to accelerate the sealing and anchoring process of the reactive metal sealing element 810. The accelerator 820 may be a heating or voltage element as described above. Liner hanger 805 has a liner 830 suspended downhole. The installation string 825 is coupled to and installs the liner hanger 805, which has the liner 830 suspended therefrom. In the illustration of FIG. 13, the activation of the accelerator 820 may be remotely activated, time delayed, or wirelessly activated as desired. It is also to be understood, that use of an accelerator 820 is optional in the example of FIG. 13 and is presented here to describe one potential method of the installation of the liner hanger 805. Liner 830 comprises liner reactive metal sealing elements 835 and production screens 840. Liner reactive metal sealing elements 835 may be accelerated in some alternative examples via the accelerator 820 or an alternative accelerator positioned on the liner 830. In the illustrated example of FIG. 13, the liner reactive metal sealing elements 835 are not accelerated.

Figure 14:
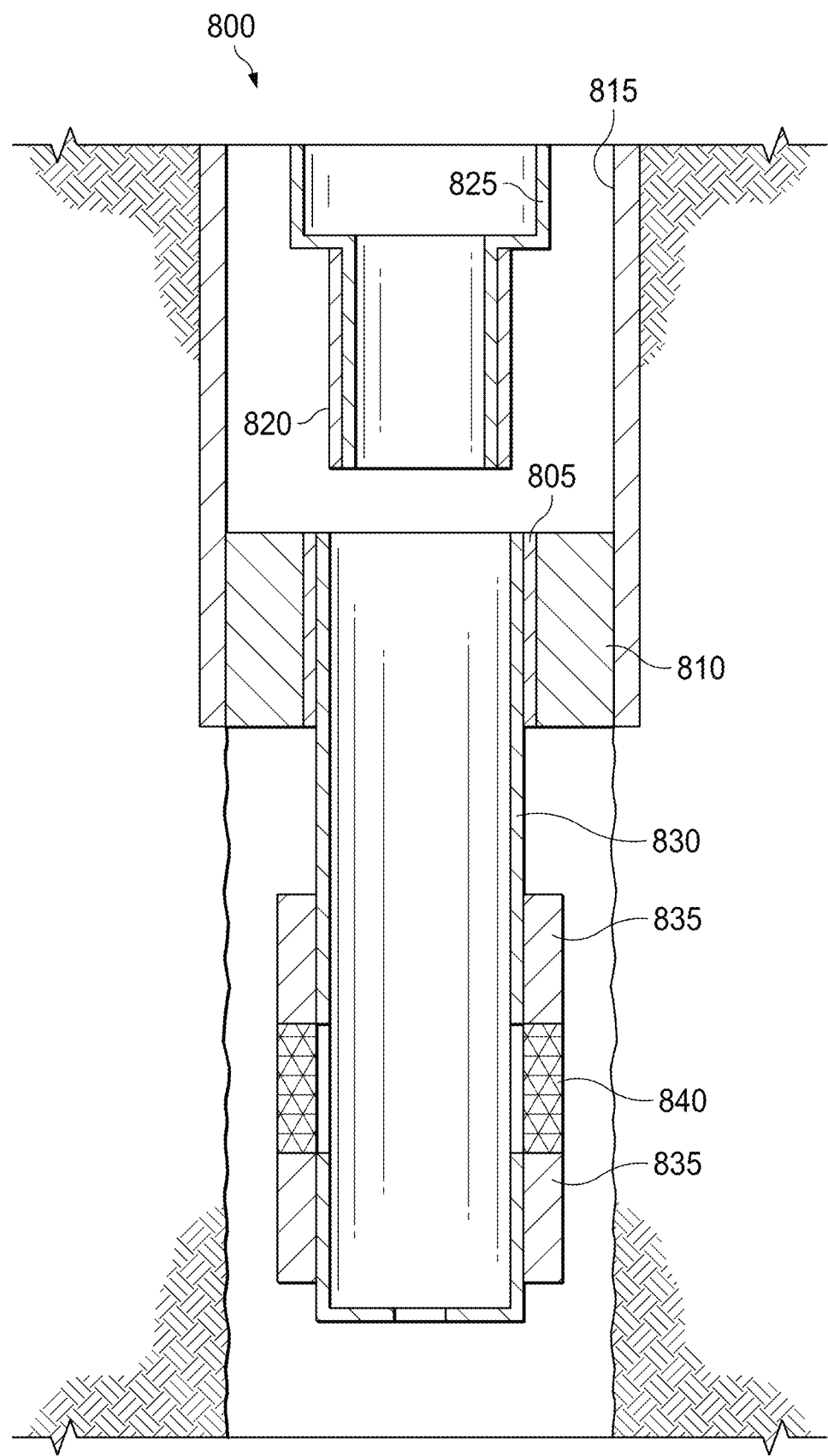
FIG. 14 is a cross-section further illustrating the example liner hanger system of FIG. 13 in accordance with the examples disclosed herein.

FIG. 14 is a cross-section illustrating the example wellbore system of 800 of FIG. 13 after the sealing and anchoring process of the reactive metal sealing element 810 has proceeded to seal and anchor the liner hanger 805 to the surface 815. Upon completion, the installation string 825 is tugged by pulling on it from the surface 815. Tugging the installation string 825 may test whether the liner hanger 805 is successfully anchored to the surface 815. As the liner reactive metal sealing elements 835 were not accelerated, they may not have completed the sealing and anchoring process as quickly as the reactive metal sealing elements 810. In some examples, different species of reactive metals may be chosen for the reactive metal sealing elements 810 and the liner reactive metal sealing elements 835 such that the rate of the sealing process may be tailored as desired.

Figure 15:
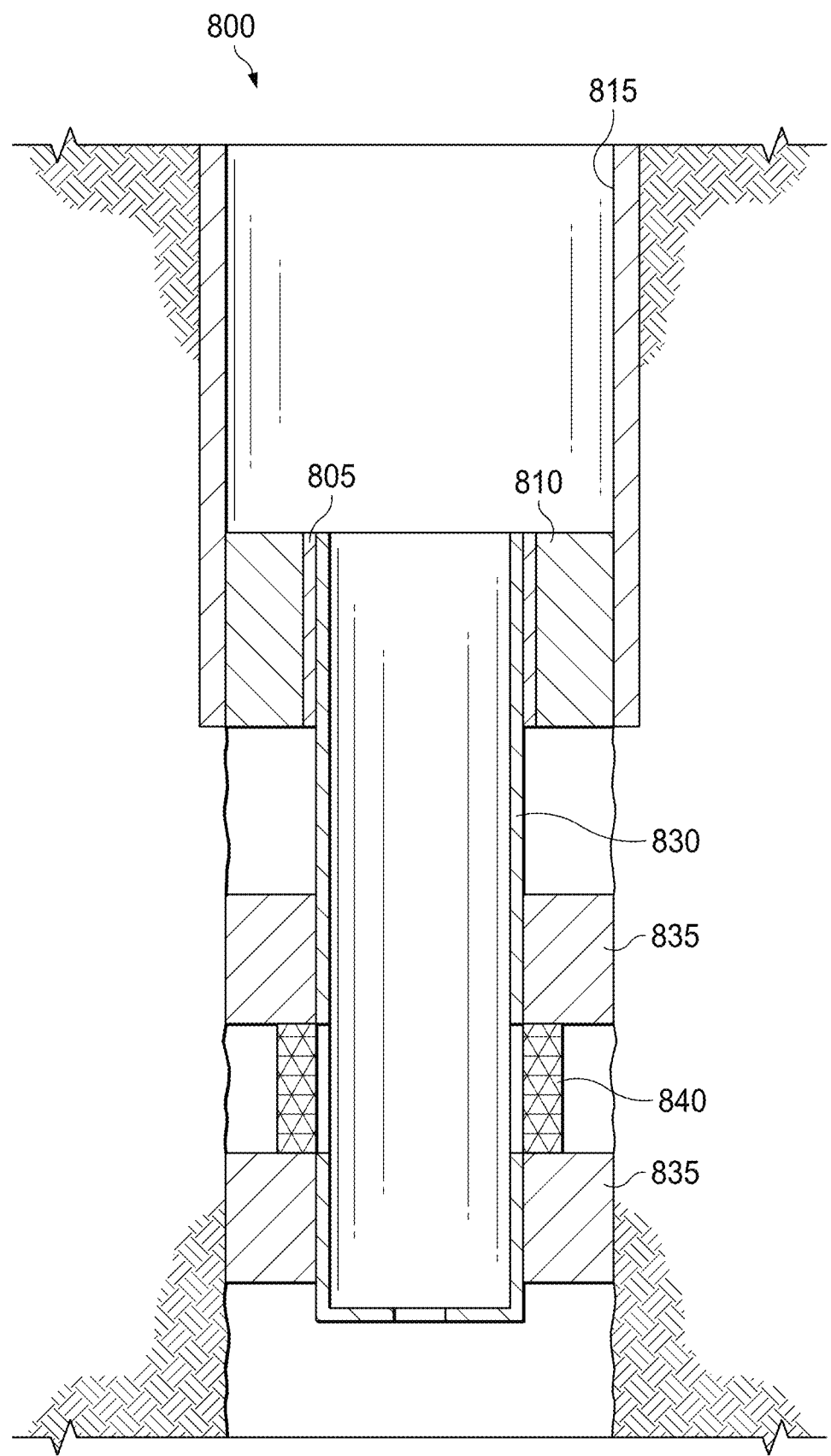
FIG. 15 is a cross-section further illustrating the example liner hanger system of FIG. 14 in accordance with the examples disclosed herein.

FIG. 15 is a cross-section illustrating the example wellbore system of 800 of FIG. 14 where the liner reactive metal sealing elements 835 have completed the sealing and anchoring process for the liner 830. Production may occur through production screen 840. Although only one production screen 840 and two liner reactive metal sealing elements 835 are illustrated, it is to be understood that multiples of both elements may be used as desired. Further, the example of FIG. 15 illustrates production occurring through the liner 830 and the sealing and anchoring of the liner 830 with reactive metal sealing elements 835 instead of a cement.

It should be clearly understood that the example illustrated by FIGS. 13-15 is merely a general application of the principles of this disclosure in practice, and a wide variety of other examples are possible. Therefore, the scope of this disclosure is not limited in any manner to the details of any of the FIGURES described herein.

Figure 16:
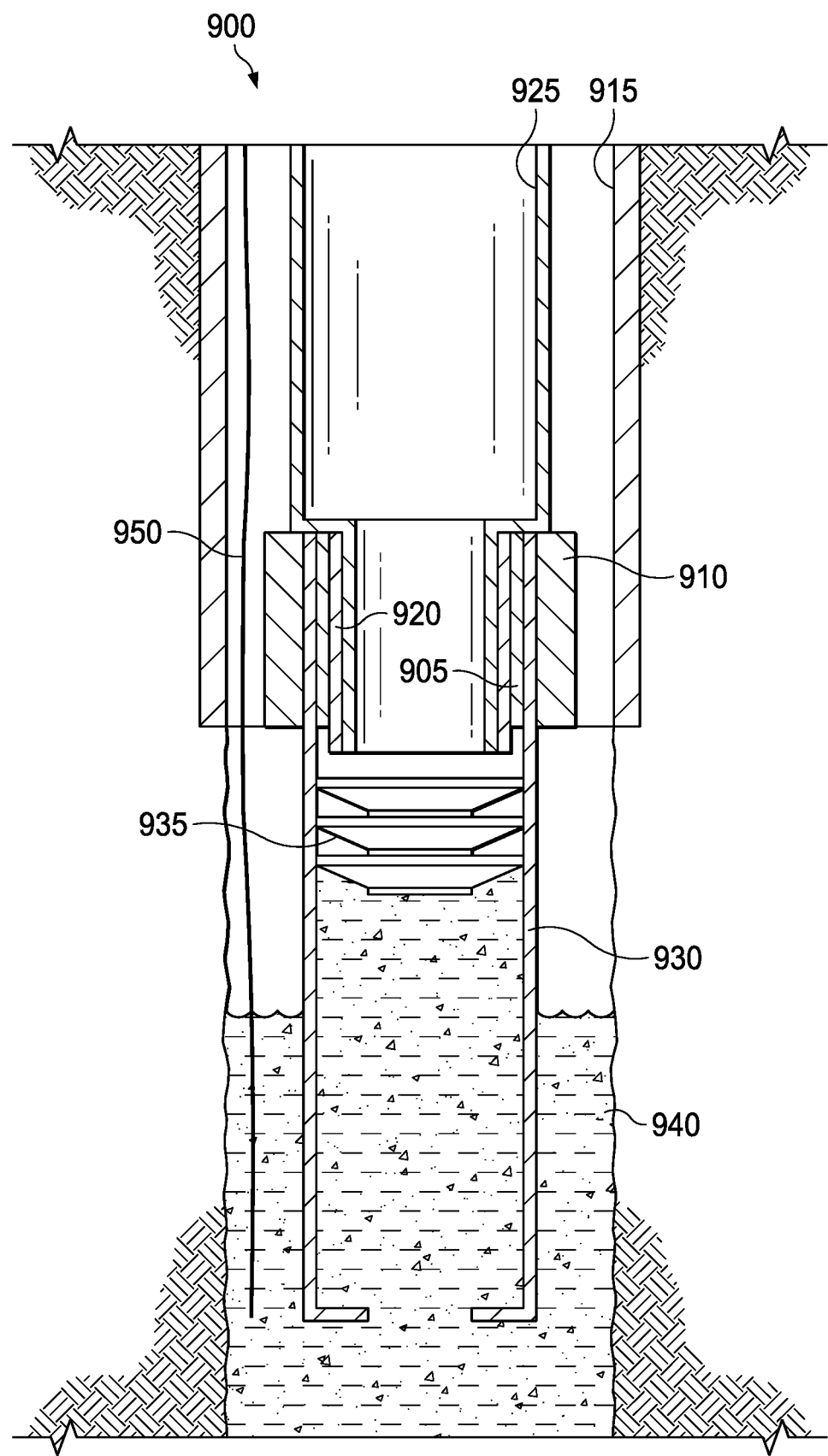
FIG. 16 is a cross-section illustration of a liner hanger system having cable disposed proximate the reactive metal sealing element in accordance with the examples disclosed herein.

FIG. 16 is a cross-section illustration of an example wellbore system, generally 900, which comprises liner hanger 905. Liner hanger 905 comprises a reactive metal sealing element 910. The reactive metal sealing element 910 seals against surface 915, illustrated as a surface of an intermediate casing, but may also be the surface of a set cement layer. Surface 915 is proximate to the reactive metal sealing element 910. Accelerator 920 has been deployed on an installation string 925. The accelerator 920 is positioned proximate to the reactive metal sealing element 910 to accelerate the sealing and anchoring process of the reactive metal sealing element 910. The accelerator 920 may be a heating or voltage element as described above. Liner hanger 905 has a liner 930 suspended downhole. The installation string 925 is coupled to and installs the liner hanger 905, which has the liner 930 suspended therefrom. In the illustration of FIG. 16, the activation of the accelerator 920 occurs when the wiper plug 935 or the preceding cement slurry 940 passes the accelerator 920. For example, the wiper plug 935 or preceding cement slurry 940 may trigger activation of the accelerator 920 by actuating a switch on the accelerator 920, chemical activation of a component within the accelerator 920, triggering a sensor within the accelerator 920, etc. It is to be understood that the activation of the accelerator 920 via the wiper plug 935 or preceding cement slurry 940 is optional, and the accelerator may be activated through other mechanisms as described above. Cable 950 is disposed in the annular region between the surface 915 and the liner hanger 905. Cable 950 may be an electrical cable, fiber optic cable, control line, hydraulic dine, gas lift, or a combination of cables.

Figure 17:
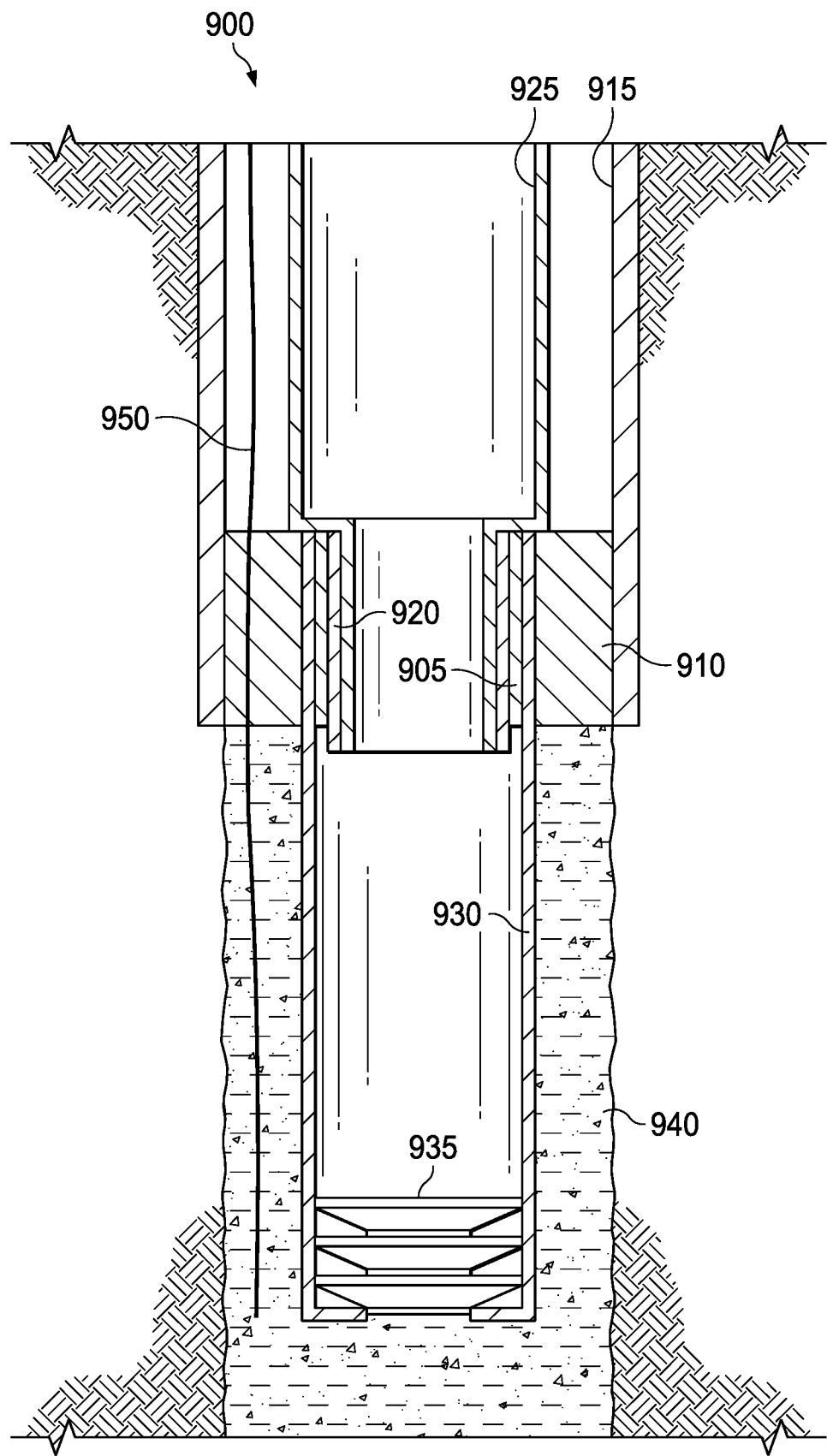
FIG. 17 is a cross-section further illustrating the example liner hanger system of FIG. 16 in accordance with the examples disclosed herein.

FIG. 17 is a cross-section illustrating the example wellbore system of 900 after the passage of the wiper plug 935 and the preceding cement slurry 940. The sealing and anchoring process of the reactive metal sealing element 910 has proceeded to seal and anchor the liner hanger 905 to the surface 915. The cement slurry 940 has also been positioned and may be in the process of setting and then sealing and anchoring the liner 930 in place. Upon completion, the installation string 925 is tugged by pulling on it from the surface 915. Tugging the installation string 925 may test whether the liner hanger 905 is successfully anchored to the surface 915. The reactive metal sealing element 910 has also sealed around cable 950 allowing cable 950 to bypass the seal and anchor formed by the solidified reactive metal sealing element 910. As such, cable 950 may convey electricity, pressure, data, etc. across the formed seal as desired without the need to conduct a separate bypass or installation operation and also without impact to the integrity of the seal and anchor.

Figure 18:
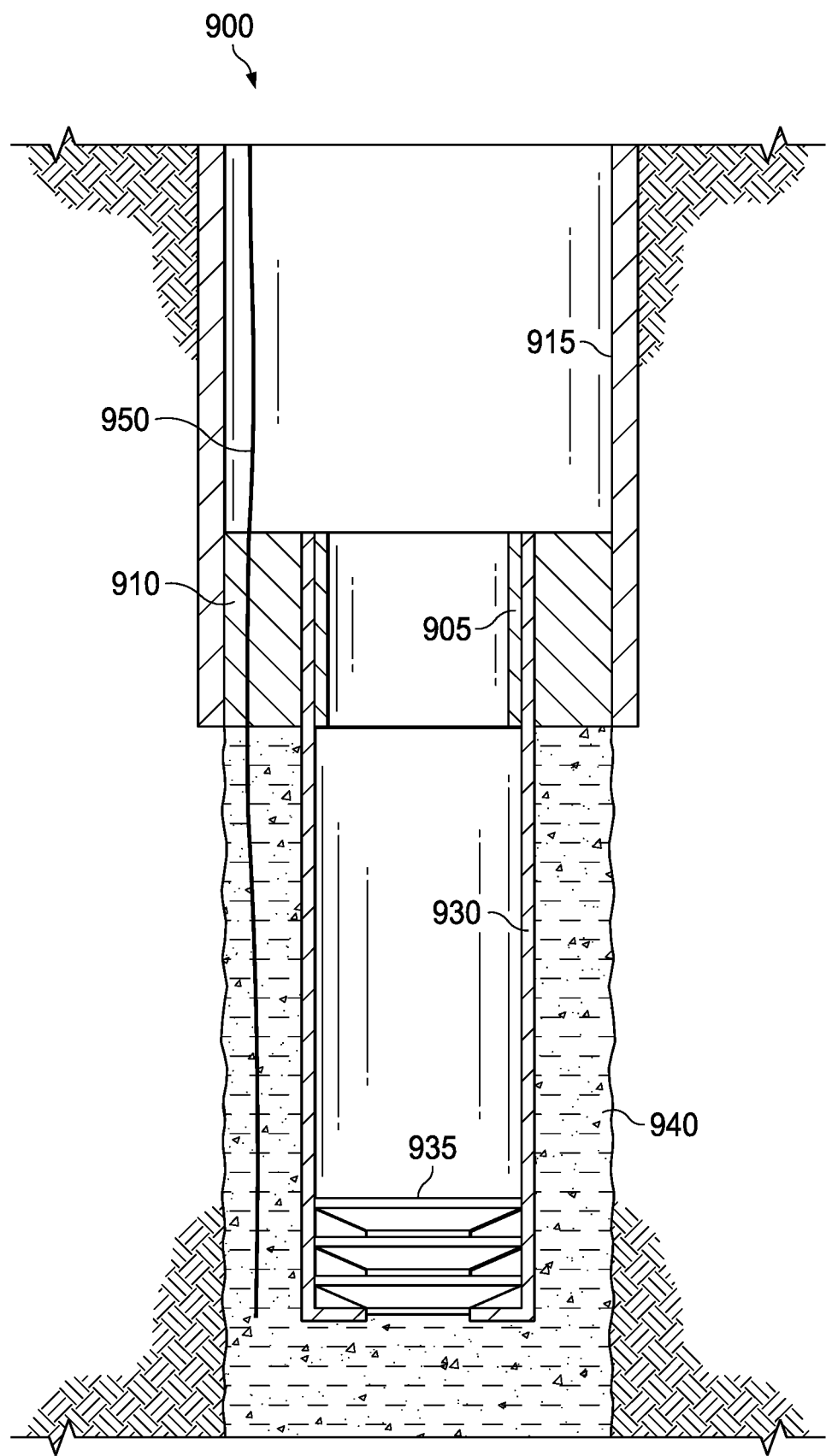
FIG. 18 is a cross-section further illustrating the example liner hanger system of FIG. 17 in accordance with the examples disclosed herein.

FIG. 18 is a cross-section illustrating the example wellbore system of 900 of FIG. 17 where the liner hanger 905 has been verified as being successfully installed and was decoupled from the installation string 925. The installation string 925, as well as the accelerator 920 disposed thereon, are pulled uphole and removed from the wellbore as illustrated by their absence from the illustration of FIG. 18. Cable 950 remains in place after removal of the installation string 925.

It should be clearly understood that the example illustrated by FIGS. 16-18 is merely a general application of the principles of this disclosure in practice, and a wide variety of other examples are possible. Therefore, the scope of this disclosure is not limited in any manner to the details of any of the FIGURES described herein.

It is also to be recognized that the disclosed non-expandable liner hangers and the reactive metal sealing elements may also directly or indirectly affect the various downhole equipment and tools that may come into contact with the non-expandable liner hangers and the reactive metal sealing elements during operation. Such equipment and tools may include, but are not limited to: wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in any of the FIGURES.

Provided are methods for suspending a liner in accordance with the disclosure and the illustrated FIGURES. An example method comprises positioning a non-expandable liner hanger in a wellbore, wherein a liner is coupled to the liner hanger, wherein the liner hanger comprises: a conduit body; and a reactive metal sealing element disposed on the conduit body, wherein the reactive metal sealing element comprises a reactive metal having a first volume. The method further comprises contacting the reactive metal with a fluid that reacts with the reactive metal to produce a reaction product having a second volume greater than the first volume; and contacting a surface adjacent to the reactive metal sealing element with the reaction product to form a seal against the surface and to anchor the liner hanger from the surface, wherein anchoring the liner hanger to the surface suspends the liner in the wellbore.

Additionally or alternatively, the method may include one or more of the following features individually or in combination. The reactive metal may comprise a metal selected from the group consisting of magnesium, calcium, aluminum, tin, zinc, beryllium, barium, manganese, and any combination thereof. The reactive metal may comprise a metal alloy selected from the group consisting of magnesium-zinc, magnesium-aluminum, calcium-magnesium, aluminum-copper, and any combination thereof. The liner hanger may comprise a spacer element. The method may further comprise placing a cup seal proximate to the reactive metal sealing element. The method may further comprise accelerating the reaction of the reactive metal with the fluid using an accelerator. The accelerator may be a heating element. The accelerator may be a voltage element. The accelerator may be actuated with a wiper plug, darts, cementing plugs, balls, or wireline tool conveyed through the interior of the conduit body. The liner hanger may comprise the accelerator. The accelerator may be coupled to an installation string used to position the liner hanger in the wellbore. A cable may traverse the seal.

Provided are non-expandable liner hangers for suspending a liner in accordance with the disclosure and the illustrated FIGURES. An example non-expandable liner hanger comprises a conduit body; and a reactive metal sealing element disposed on the conduit body.

Additionally or alternatively, the non-expandable liner hanger may include one or more of the following features individually or in combination. The reactive metal may comprise a metal selected from the group consisting of magnesium, calcium, aluminum, tin, zinc, beryllium, barium, manganese, and any combination thereof. The reactive metal may comprise a metal alloy selected from the group consisting of magnesium-zinc, magnesium-aluminum, calcium-magnesium, aluminum-copper, and any combination thereof. The liner hanger may comprise a spacer element. The liner hanger may further comprise placing a cup seal proximate to the reactive metal sealing element. The reaction of the reactive metal with the fluid may be accelerated using an accelerator. The accelerator may be a heating element. The accelerator may be a voltage element. The accelerator may be actuated with a wiper plug, darts, cementing plugs, balls, or wireline tool conveyed through the interior of the conduit body. The liner hanger may comprise the accelerator. The accelerator may be coupled to an installation string used to position the liner hanger in the wellbore. A cable may traverse the seal.

Provided are systems for suspending a liner in a wellbore in accordance with the disclosure and the illustrated FIGURES. An example system comprises a non-expandable liner hanger comprising: a conduit body; and a reactive metal sealing element disposed on the conduit body. The system further comprises the liner suspended from the liner hanger; and an installation string coupled to the liner hanger.

Additionally or alternatively, the system may include one or more of the following features individually or in combination. The reactive metal may comprise a metal selected from the group consisting of magnesium, calcium, aluminum, tin, zinc, beryllium, barium, manganese, and any combination thereof. The reactive metal may comprise a metal alloy selected from the group consisting of magnesium-zinc, magnesium-aluminum, calcium-magnesium, aluminum-copper, and any combination thereof. The liner hanger may comprise a spacer element. The liner hanger may further comprise placing a cup seal proximate to the reactive metal sealing element. The reaction of the reactive metal with the fluid may be accelerated using an accelerator. The accelerator may be a heating element. The accelerator may be a voltage element. The accelerator may be actuated with a wiper plug, darts, cementing plugs, balls, or wireline tool conveyed through the interior of the conduit body. The accelerator may be disposed on the liner hanger or the installation string. The accelerator may be coupled to an installation string used to position the liner hanger in the wellbore. A cable may traverse the seal.

The preceding description provides various examples of the apparatus, systems, and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for suspending a liner comprising:
positioning a non-expandable liner hanger in a wellbore, wherein a liner is coupled to the liner hanger, wherein the liner hanger comprises:
a conduit body; and
a reactive metal sealing element disposed on the conduit body, wherein the reactive metal sealing element comprises a reactive metal having a first volume;
contacting the reactive metal with a fluid that reacts with the reactive metal to produce a reaction product having a second volume greater than the first volume thereby anchoring the liner hanger; wherein the reaction product is a metal hydroxide, metal oxide, or a combination thereof;
accelerating the reaction of the reactive metal with the fluid using an accelerator; wherein the accelerator is a heating element or a voltage element; and
contacting a surface adjacent to the reactive metal sealing element with the reaction product to form a seal against the surface and to anchor the liner hanger from the surface with the reaction product, wherein anchoring the liner hanger to the surface suspends the liner in the wellbore.

2. The method of claim 1, wherein the reactive metal comprises a metal selected from the group consisting of magnesium, calcium, aluminum, tin, zinc, beryllium, barium, manganese, and any combination thereof.

3. The method of claim 1, wherein the reactive metal comprises a metal alloy selected from the group consisting of magnesium-zinc, magnesium-aluminum, calcium-magnesium, aluminum-copper, and any combination thereof.

4. The method of claim 1, wherein the liner hanger comprises a spacer element.

5. The method of claim 1, further comprising a cup seal proximate to the reactive metal sealing element.

6. The method of claim 1, wherein the accelerator is the heating element.

7. The method of claim 1, wherein the accelerator is the voltage element.

8. The method of claim 1, wherein the accelerator is actuated with a wiper plug, darts, cementing plugs, balls, or wireline tool conveyed through the interior of the conduit body.

9. The method of claim 1, wherein the liner hanger comprises the accelerator.

10. The method of claim 1, wherein the accelerator is coupled to an installation string used to position the liner hanger in the wellbore.

11. The method of claim 1, wherein a cable traverses the seal.

12. A non-expandable liner hanger comprising:
a conduit body; and
a reactive metal sealing element having a first volume disposed on the conduit body; wherein the reactive metal sealing element is configured to react with a fluid to produce a reaction product having a second volume greater than the first volume thereby anchoring the liner hanger against an adjacent surface; wherein the reaction product is a metal hydroxide, metal oxide, or a combination thereof
an accelerator configured to accelerate the reaction of the reactive metal with the fluid; wherein the accelerator is a heating element or a voltage element.

13. The liner hanger of claim 12, wherein the reactive metal comprises a metal selected from the group consisting of magnesium, calcium, aluminum, tin, zinc, beryllium, barium, manganese, and any combination thereof.

14. The liner hanger of claim 12, wherein the reactive metal comprises a metal alloy selected from the group consisting of magnesium-zinc, magnesium-aluminum, calcium-magnesium, aluminum-copper, and any combination thereof.

15. The liner hanger of claim 12, further comprising a spacer element.

16. A system for suspending a liner in a wellbore comprising:
a non-expandable liner hanger comprising:
a conduit body; and
a reactive metal sealing element having a first volume disposed on the conduit body; wherein the reactive metal sealing element is configured to react with a fluid to produce a reaction product having a second volume greater than the first volume thereby anchoring the liner hanger against an adjacent surface; wherein the reaction product is a metal hydroxide, metal oxide, or a combination thereof;
an accelerator configured to accelerate the reaction of the reactive metal with the fluid; wherein the accelerator is a heating element or a voltage element;
the liner suspended from the liner hanger; and
an installation string coupled to the liner hanger.

17. The system of claim 16, wherein the reactive metal comprises a metal selected from the group consisting of magnesium, calcium, aluminum, tin, zinc, beryllium, barium, manganese, and any combination thereof.

18. The system of claim 16, wherein the accelerator is disposed on the liner hanger or the installation string.

19. The system of claim 16, further comprising a cup seal proximate to the reactive metal sealing element.

20. The system of claim 16, wherein the liner hanger comprises a spacer element.

* * * * *